US009415645B2

(12) United States Patent
Racine et al.

(10) Patent No.: US 9,415,645 B2
(45) Date of Patent: Aug. 16, 2016

(54) VALVE ASSEMBLY FOR A CENTRAL TIRE INFLATION SYSTEM

(71) Applicant: Dana Heavy Vehicle Systems Group, LLC, Maumee, OH (US)

(72) Inventors: Lloyd G. Racine, Madison Heights, MI (US); Jason M. Sidders, Perrysburg, OH (US); Pheng Lee, Perrysburg, OH (US); Lucas A. Balistreri, Rudolph, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 107 days.

(21) Appl. No.: 14/177,574

(22) Filed: Feb. 11, 2014

(65) Prior Publication Data

US 2014/0224352 A1    Aug. 14, 2014

Related U.S. Application Data

(60) Provisional application No. 61/763,048, filed on Feb. 11, 2013, provisional application No. 61/776,431, filed on Mar. 11, 2013, provisional application No. 61/792,778, filed on Mar. 15, 2013, provisional application No. 61/865,790, filed on Aug. 14, 2013, provisional application No. 61/925,749, filed on Jan. 10, 2014.

(51) Int. Cl.
*F16K 15/20* (2006.01)
*B60C 29/00* (2006.01)
*B60C 23/00* (2006.01)

(52) U.S. Cl.
CPC ............. *B60C 29/002* (2013.04); *B60C 23/003* (2013.01); *Y10T 137/3584* (2015.04); *Y10T 137/3631* (2015.04); *Y10T 137/88062* (2015.04)

(58) Field of Classification Search
CPC .................. Y10T 137/3631; Y10T 137/3646; Y10T 137/7779; Y10T 137/778; Y10T 137/7847; Y10T 137/7848
USPC .......................................................... 138/46
See application file for complete search history.

(56) References Cited

U.S. PATENT DOCUMENTS

| 780,986 A | 1/1905 | Francis |
| 1,729,469 A | 9/1929 | Anderson |

(Continued)

FOREIGN PATENT DOCUMENTS

| DE | 102009000394 A1 | 10/2009 |
| DE | 102008062065 A1 | 6/2010 |

(Continued)

OTHER PUBLICATIONS

European Patent Office, International Search Report and Written Opinion, issued in PCT/US2014/015779; May 6, 2014, 9 pages, European Patent Office, P.B. 5818 Patentlaan 2, NL-2280 HV Rijswijk, Netherlands.

*Primary Examiner* — R. K. Arundale
(74) *Attorney, Agent, or Firm* — Marshall & Melhorn, LLC

(57) ABSTRACT

A valve assembly for a central tire inflation system is provided. The valve assembly includes a first housing having a first port connected to a second port via a cavity. The second port is in fluid communication with a wheel assembly. A biasing member is disposed in the cavity adjacent a first perforation formed in the first housing. A valve member is contacted by the biasing member. The valve member includes a first portion having an outer surface which is unbroken adjacent an end to allow a pressurized fluid to flow around it. The first portion reduces in diameter toward the end.

19 Claims, 18 Drawing Sheets

(56) References Cited

U.S. PATENT DOCUMENTS

| | | | |
|---|---|---|---|
| 2,307,949 A | 1/1943 | Phillips | |
| 2,690,757 A | 10/1954 | Orchowski | |
| 3,105,477 A | 10/1963 | Lowther | |
| 3,165,097 A | 1/1965 | Lowther | |
| 3,503,417 A | 3/1970 | Toda et al. | |
| 3,593,742 A | 7/1971 | Taylor | |
| 3,647,176 A | 3/1972 | Usry | |
| 3,838,717 A | 10/1974 | Wolf | |
| 4,075,294 A | 2/1978 | Saito et al. | |
| 4,428,396 A * | 1/1984 | Wall | F16K 17/18 137/493 |
| 4,493,474 A | 1/1985 | Ohyama | |
| 4,744,399 A | 5/1988 | Magnuson et al. | |
| 4,924,926 A | 5/1990 | Schultz et al. | |
| 4,969,628 A | 11/1990 | Reich et al. | |
| 5,004,008 A | 4/1991 | Drucker | |
| 5,085,246 A * | 2/1992 | Griinke | F16K 17/30 137/504 |
| 5,141,589 A | 8/1992 | Mittal | |
| 5,181,977 A | 1/1993 | Gneiding et al. | |
| 5,244,027 A | 9/1993 | Freigang | |
| 5,249,609 A | 10/1993 | Walker et al. | |
| 5,309,969 A | 5/1994 | Mittal | |
| 5,313,995 A | 5/1994 | Schultz | |
| 5,327,346 A | 7/1994 | Goodell | |
| 5,398,743 A | 3/1995 | Bartos | |
| 5,409,045 A | 4/1995 | Walker et al. | |
| 5,465,772 A | 11/1995 | Sartor | |
| 5,540,268 A | 7/1996 | Mittal | |
| 5,553,647 A | 9/1996 | Jaksic | |
| 5,587,698 A | 12/1996 | Genna | |
| 5,618,361 A | 4/1997 | Colussi et al. | |
| 5,629,874 A | 5/1997 | Mittal | |
| 5,970,996 A | 10/1999 | Markey et al. | |
| 6,098,682 A | 8/2000 | Kis | |
| 6,250,327 B1 * | 6/2001 | Freigang | B60C 23/003 137/225 |
| 6,409,055 B1 | 6/2002 | Officier | |
| 6,427,714 B2 | 8/2002 | Freigang et al. | |
| 6,561,017 B1 | 5/2003 | Claussen et al. | |
| 6,604,414 B1 | 8/2003 | Claussen et al. | |
| 6,769,666 B2 | 8/2004 | Hall et al. | |
| 6,779,618 B2 | 8/2004 | Tarasinski | |
| 6,865,930 B1 | 3/2005 | Claussen et al. | |
| 6,894,607 B1 | 5/2005 | Claussen et al. | |
| 6,920,895 B2 | 7/2005 | Avis et al. | |
| 7,028,983 B2 | 4/2006 | Ozaki et al. | |
| 7,051,585 B2 | 5/2006 | Claussen et al. | |
| 7,140,386 B2 | 11/2006 | Avis et al. | |
| 7,265,659 B2 | 9/2007 | Claussen et al. | |
| 7,367,371 B2 | 5/2008 | Meydieu et al. | |
| 7,437,920 B2 | 10/2008 | Beverly et al. | |
| 7,509,969 B2 | 3/2009 | Huang | |
| 7,530,379 B1 | 5/2009 | Becker et al. | |
| 7,538,661 B2 | 5/2009 | Claussen et al. | |
| 7,690,411 B2 | 4/2010 | Wilson | |
| 7,950,414 B2 | 5/2011 | Suzuki et al. | |
| 7,963,307 B2 | 6/2011 | Rudolf et al. | |
| 8,047,224 B2 | 11/2011 | Eichler | |
| 8,069,890 B2 | 12/2011 | Resare et al. | |
| 8,087,439 B2 | 1/2012 | Hobe et al. | |
| 8,122,926 B2 | 2/2012 | Rogers | |
| 8,132,607 B2 | 3/2012 | Kusunoki et al. | |
| 8,135,561 B2 | 3/2012 | Lin et al. | |
| 8,245,746 B2 | 8/2012 | Stanczak | |
| 8,344,868 B2 | 1/2013 | Browne et al. | |
| 8,353,311 B2 | 1/2013 | Rigamonti et al. | |
| 8,479,790 B2 | 7/2013 | Resare et al. | |
| 8,479,791 B2 | 7/2013 | Schulte et al. | |
| 8,590,585 B2 | 11/2013 | Rogers | |
| 8,844,596 B2 | 9/2014 | Medley et al. | |
| 2002/0189679 A1 * | 12/2002 | Avis | F16K 17/30 137/462 |
| 2005/0121125 A1 | 6/2005 | Maquaire | |
| 2006/0180256 A1 | 8/2006 | Mittal | |
| 2007/0187015 A1 | 8/2007 | Alff | |
| 2009/0314406 A1 | 12/2009 | Browne et al. | |
| 2009/0314407 A1 | 12/2009 | Browne et al. | |

FOREIGN PATENT DOCUMENTS

| | | | |
|---|---|---|---|
| DE | 102008062072 A1 * | 6/2010 | B60C 23/003 |
| EP | 1031899 A2 | 8/2000 | |

* cited by examiner

WHEEL ASSEMBLY  FIG. 19

VALVE ASSEMBLY FOR A CENTRAL TIRE INFLATION SYSTEM

CROSS-REFERENCE TO RELATED APPLICATIONS

This application is claiming the benefit, under 35 U.S.C. 119(e), of the provisional applications granted Ser. Nos. 61/763,048 filed on Feb. 11, 2013, 61/776,431 filed on Mar. 11, 2013, 61/792,778 filed on Mar. 15, 2013, 61/865,790 filed on Aug. 14, 2013 and 61/925,749 filed on Jan. 10, 2014 the entire disclosures of which are hereby incorporated by reference.

BACKGROUND OF THE INVENTION

The invention relates to a valve assembly. More specifically, the invention relates to a valve assembly for a central tire inflation system.

Current valve designs used in tire inflation systems have minimum and maximum pressure limits which are a function of the operational temperature requirements and the backpressure characteristics of the system. As the flow through the tire inflation system increases, backpressure in the system increases. At higher flow rates and backpressures, the pressure experienced by current valve designs can be such that the valve cannot close when the tire pressure has been adjusted to a selected value.

Therefore, it would be desirable to provide a valve assembly which can effectively function at high flow rates and backpressures and that overcomes the aforementioned disadvantages.

BRIEF SUMMARY OF THE INVENTION

A valve assembly for a central tire inflation system is provided. The valve assembly comprises a first housing having a first port connected to a second port via a cavity. The second port is in fluid communication with a wheel assembly. A biasing member is disposed in the cavity adjacent a first perforation formed in the first housing. The valve assembly also comprises a valve member contacted by the biasing member. The valve member comprises a first portion having an outer surface which is unbroken adjacent an end to allow a pressurized fluid to flow around it. The first portion reduces in diameter toward the end.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
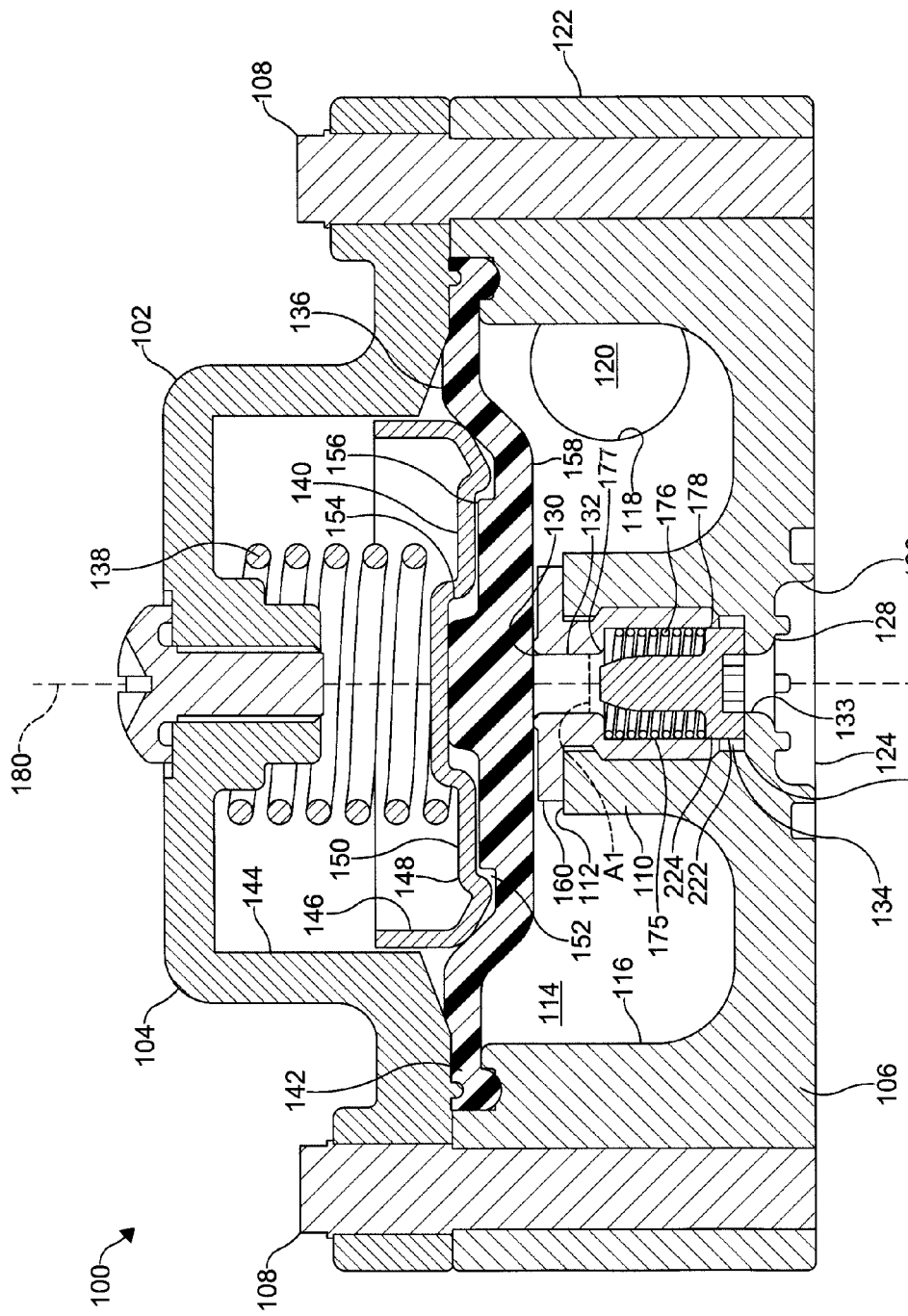
FIG. 1 is a cross-sectional view of an embodiment of a valve assembly in accordance with the invention.

It is to be understood that the invention may assume various alternative orientations and step sequences, except where expressly specified to the contrary. It is also to be understood that the specific assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Embodiments of a valve assembly 100, 300, 500 are described herein. It would be understood by one of ordinary skill in the art that the valve assembly 100, 300, 500 may have applications to passenger, commercial and off-highway vehicles. Also, it would be understood by one of ordinary skill in the art that the embodiments of the valve assembly 100, 300, 500 could have industrial, locomotive, military and aerospace applications.

The valve assembly 100, 300, 500 will be described for use with air. However, the valve assembly is not limited to use with air. Thus, alternative gaseous fluids are suitable for use with the valve assembly.

Preferably, the valve assembly 100, 300, 500 is provided as a part of a central tire inflation system (CTIS). Conventional central tire inflation systems are known in the art and the valve assembly 100, 300, 500 may be utilized as a portion thereof. Additionally, portions of a central tire inflation system will be discussed herein for describing certain embodiments of the valve assembly 100, 300, 500.

The central tire inflation system is provided on a vehicle (not depicted) to allow the operator to adjust (increase, decrease or maintain) the tire pressure of one or more wheel assemblies attached to the vehicle. Each wheel assembly comprises a tire and a wheel rim. The tire may be conventional in the art. The tire comprises an inner surface and an outer surface. A portion of the inner surface faces the wheel rim. The wheel rim may be conventional in the art. The wheel rim comprises an inner surface and an outer surface. Preferably, the tire is sealingly attached to the outer surface of the wheel rim.

Attaching the tire to the wheel rim forms a space which houses air. It should be appreciated that the space may house alternative fluids. Preferably, the air is pressurized. Within the space, air may be at a pressure from about 2 to 180 psi. The pressure exerted by the air in the space is referred to herein as tire pressure.

Utilizing the central tire inflation system, the tire pressure can be selected to be a desired value. In certain embodiments, it may be desired that the tire pressure is maintained at about 150 psi or less. The tire pressure can also be adjusted by increasing or decreasing the tire pressure. For example, the tire pressure may be adjusted from 150 psi to 10 psi or vice versa. The valve assembly 100, 300, 500 is utilized to adjust the desired tire pressure quickly over a wide range of flow rates and at high backpressure.

In order to achieve a desired tire pressure and/or adjust the tire pressure, the valve assembly 100, 300, 500 may be in or may be placed in fluid communication with another portion of the tire inflation system such as, for example, one or more fluid conduits, a rotary joint, another valve device/assembly and/or a pneumatic control unit. Additionally, the valve assembly 100, 300, 500 may be in or may be placed in fluid communication with the wheel assembly. Preferably, the valve assembly 100, 300, 500 is connected to the wheel assembly via a fluid conduit to permit fluid communication therewith.

Embodiments of the valve assembly 100 will now be described with reference to FIGS. 1-16.

The valve assembly 100 is preferably utilized as a wheel valve or as a portion of the wheel valve. Advantageously, in these embodiments, the valve assembly 100 allows the tire pressure to be adjusted and closes when a selected tire pressure is achieved even at high flow rates and high backpressures. Preferably, in these embodiments, the valve assembly 100 is attached to the wheel assembly. For example, the valve assembly 100 may be attached to the outer surface or the inner surface of the wheel rim. Alternatively, the valve assembly 100 may be attached to an inboard surface or an outboard surface of the wheel rim.

The valve assembly 100 may comprise a second housing 102. Preferably, the second housing 102 is attached to the wheel assembly and comprises a first portion 104 and a second portion 106. The first portion 104 and second portion 106 may be attached to each other by one or more fasteners 108. When the second housing 102 is attached to a wheel assembly, the second portion 106 separates the first portion 104 from the wheel assembly. The second portion 106 comprises a receiving portion 110 which has a mounting portion 112.

A major chamber 114 is defined by inner surfaces 116, 144 of the second housing 102. A control port 118 is in fluid communication with the major chamber 114. The control port 118 may also be in fluid communication with the other portions of the central tire inflation system such as a source of pressurized air (not depicted). In this embodiment, the source of pressurized air may be an air compressor provided on the vehicle and as a portion of the central tire inflation system. The control port 118 is in fluid communication with the major chamber 114 via a major fluid conduit 120. The major fluid conduit 120 extends from an outer surface 122 of the second housing 102 to the major chamber 114.

The major fluid conduit 120 may be provided in a parallel relationship with the receiving portion 110. However, in another embodiment, the major fluid conduit 120 is provided in a perpendicular relationship with the receiving portion 110. The major fluid conduit 120 may comprise portions which are of different diameters and lengths.

The major chamber 114 may also selectively be in fluid communication with a tire port 124 via a valve device 136. The tire port 124 is in fluid communication with the pressurized air in the wheel assembly. In these embodiments, air within the wheel assembly is expelled through the tire port 124 when the tire pressure is decreased and enters the wheel assembly through the tire port 124 when the tire pressure is increased. The tire port 124 is selectively in fluid communication with the control port 118 via the major chamber 124 and major fluid conduit 120. The tire port 124 is in fluid communication with a second port 128 via a fluid conduit 126 attached to the second port 128. The second port 128 is in fluid communication with and connected to a first port 130 via a cavity 134. The cavity 134 is connected to the second port 128 via a second fluid conduit 133 provided therebetween. The cavity 134 is connected to the first port 130 via a first perforation 132 which is provided therebetween. The first perforation 132 is attached to the first port 130 on an end and the cavity 134 on an opposite end.

The first port 130 is in fluid communication with the valve device 136. The valve device 136 is positioned over the first port 130 and is operable from an open position to a closed position and vice versa. The valve device 136 allows or prevents fluid communication between the major chamber 114 and first port 130. In these embodiments, the valve device 136 is positioned within the second housing 102. The valve device 136 comprises a major biasing member 138, a backing plate 140 and a diaphragm portion 142. The major biasing member 138, backing plate 140 and diaphragm portion 142 are concentric.

The major biasing member 138 is disposed within the chamber 114 abutting the first portion 104 of the second housing 102. The major biasing member 138 may be a spring such as, for example, a coil spring. The major biasing member 138 is disposed between the inner surface 144 of the second housing 102 and the backing plate 140. The major biasing member 138 contacts the backing plate 140 and biases the valve device 136 toward the tire port 124 and to the closed position.

The backing plate 140 comprises a major wall portion 146 and a disk portion 148. The major wall portion 146 is attached to and generally extends away from the disk portion 148. The major wall portion 146 is disposed adjacent the first portion 104 of the housing 102. The disk portion 148 comprises a biasing surface 150 and a mating surface 152. The biasing surface 150 is contacted by the major biasing member 138.

The mating surface 152 defines a groove 154 which receives a portion of the diaphragm portion 142.

The diaphragm portion 142 is generally disk-shaped and may be formed from rubber or another elastomeric material. The diaphragm portion 142 comprises a first surface 156 and a second surface 158. The first surface 156 is in contact with the backing plate 140 and is received by the groove 154. The second surface 158 contacts a first housing 160 to provide a seal over the first port 130 when the valve device 136 is in the closed position.

The valve device 136 is in fluid communication with the control port 118 via the major chamber 114 and major fluid conduit 120. Also, the valve device 136 is in fluid communication with the first perforation 132 via the first port 130. The valve device 136 selectively allows or prevents fluid communication between the wheel assembly and the air compressor. In the open position, the valve device 136 allows fluid communication between the control port 118 and the tire port 124. In the closed position, the valve device 136 prevents fluid communication between the control port 118 and the tire port 124 by providing the seal over the first port 130.

The valve assembly 100 comprises a first housing 160. In the embodiments of FIGS. 1-16, the first housing 160 is positioned within the second housing 102 between the diaphragm portion 142 and the receiving portion 110. In these embodiments, the first housing 160 is received by the receiving portion 110 and a portion of the first housing 160 is disposed therein.

Figure 2:
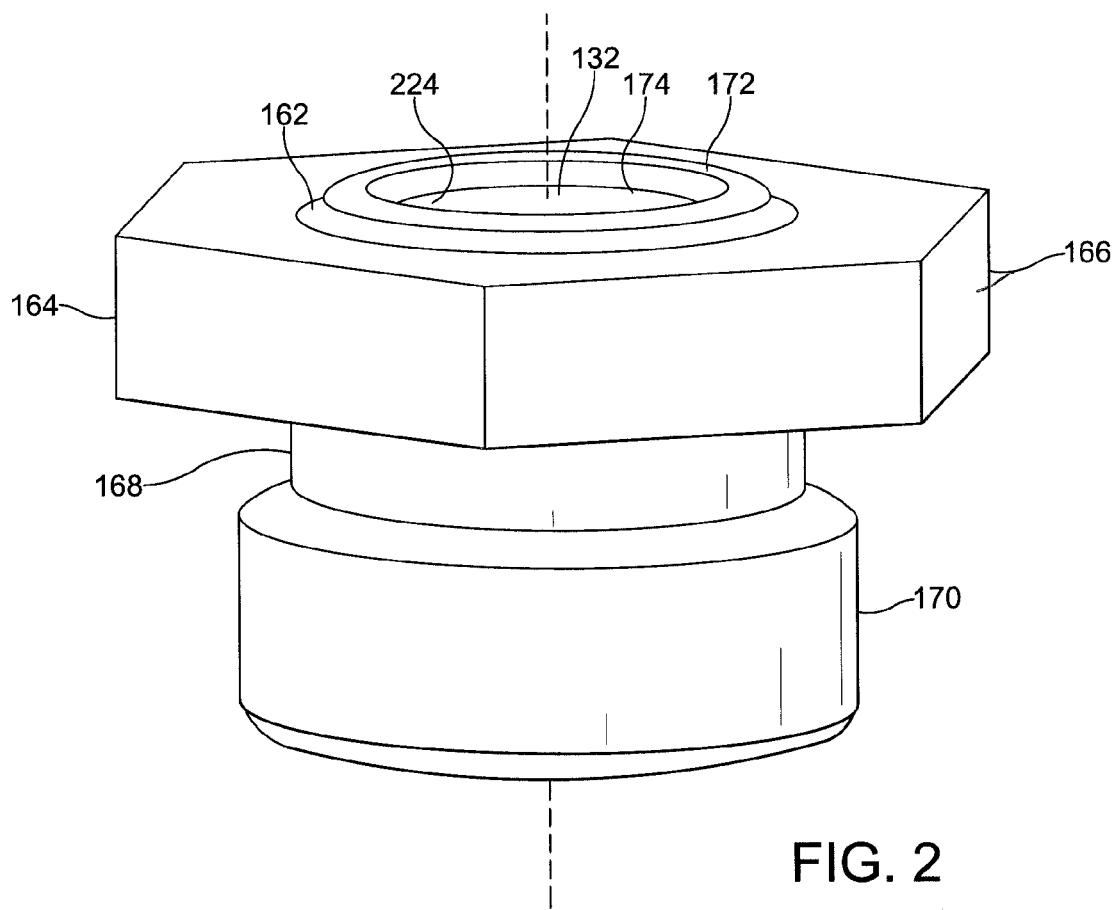
FIG. 2 is a perspective view of an embodiment of the first housing of the valve assembly of FIG. 1.

As shown best in FIG. 2, the first housing 160 may comprise a center portion 162 and a flange portion 164. The center portion 162 and the flange portion 164 are concentric. The flange portion 164 is attached to the center portion 162 and extends away therefrom. The flange portion 164 may comprise a plurality of outer surfaces 166 which may define a hexagonal shape. Referring back to FIG. 1, the flange portion 164 mates with the mounting portion 112 so that the position the first housing 160 is maintained relative to the receiving portion 110.

Referring back to FIG. 2, the center portion 162 comprises a small diameter portion 168 and a large diameter portion 170. The small diameter portion 168 and the large diameter portion 170 are attached to each other and are concentric. The center portion 162 also comprises a lip 172 attached to the small diameter portion 168. As illustrated in FIG. 1, the lip 172 may be annular and is sealingly contacted by the diaphragm portion 142 when the valve device 136 is in the closed position. A portion of the small diameter portion 168 and the large diameter portion 170 are disposed within the receiving portion 110. In certain embodiments like those illustrated in FIGS. 7-9, a retaining ring 167 may be received by an inner groove 171 provided adjacent an end of the large diameter portion 170.

Referring back to FIG. 2, the small diameter portion 168 may be of a cylindrical shape and has a wall portion 174 that defines the first perforation 132. The large diameter portion 170 may be of a cylindrical shape and defines a second perforation 175. The first perforation 132 is of a diameter which is less than that of the second perforation 175. In the embodiments illustrated in FIGS. 1 and 2, the first perforation 132 is of a substantially constant diameter adjacent the lip 172 and includes a filleted end portion 177 adjacent a biasing member 176. In the embodiments illustrated in FIGS. 8 and 9, the first perforation 132 is of a substantially constant diameter adjacent the lip 172 and includes a tapered diameter portion 173 adjacent the biasing member 176. The tapered diameter portion 173 improves the flow of pressurized air through the first perforation 132 when the tire pressure is being decreased as is represented in FIG. 9. The tapered diameter portion 173 is formed by a surface of the wall portion 174. Preferably, the surface is provided at an angle. The angle of the surface relative to a centerline 180 is selected to provide an area A1 in a predetermined position within the first perforation 132.

An end 232 of the biasing member 176 is received in a groove 234 formed radially between the small diameter portion 168 and large diameter portion 170. The groove 234 is an annular recess of a depth which allows the biasing member 176 to undergo a selected amount of compression if, as is shown in FIG. 9, the base 212 contacts the first housing 160.

Figure 7:
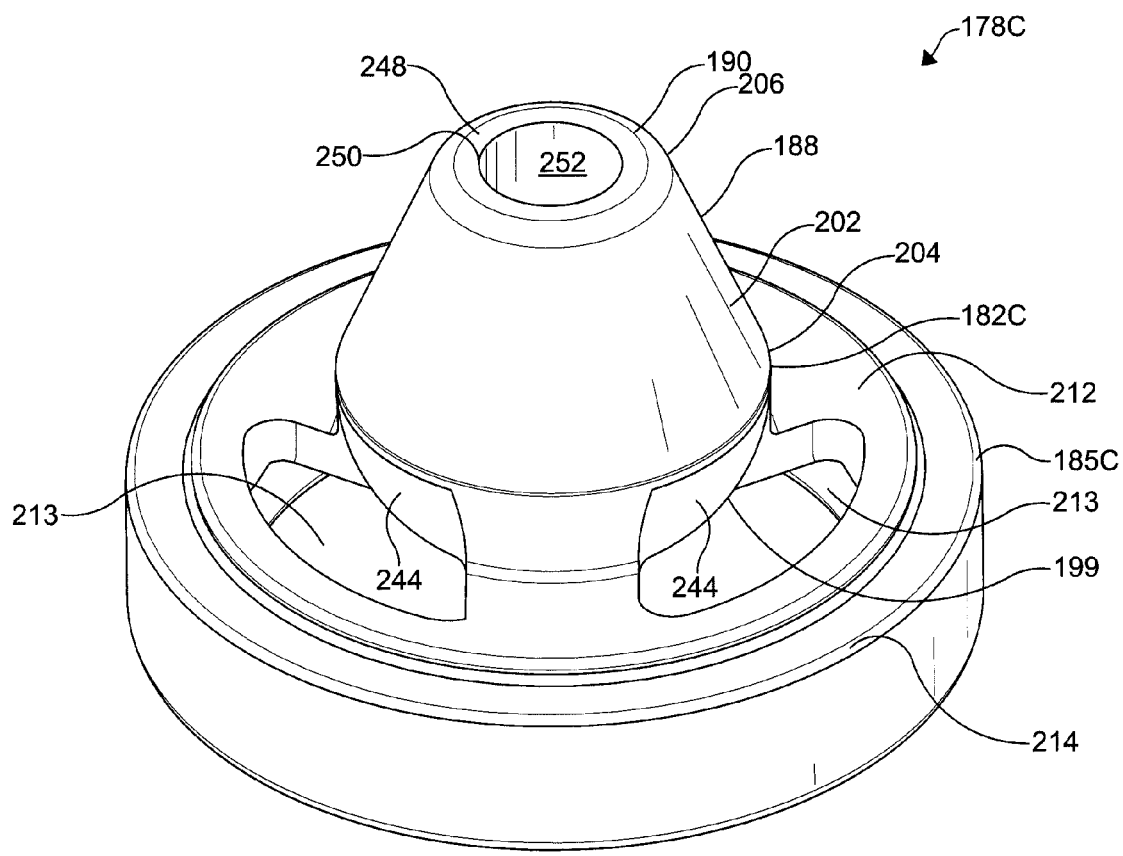
FIG. 7 is a perspective view of another embodiment of a valve member suitable for in the valve assemblies of FIGS. 1 and 4.
Figure 8:
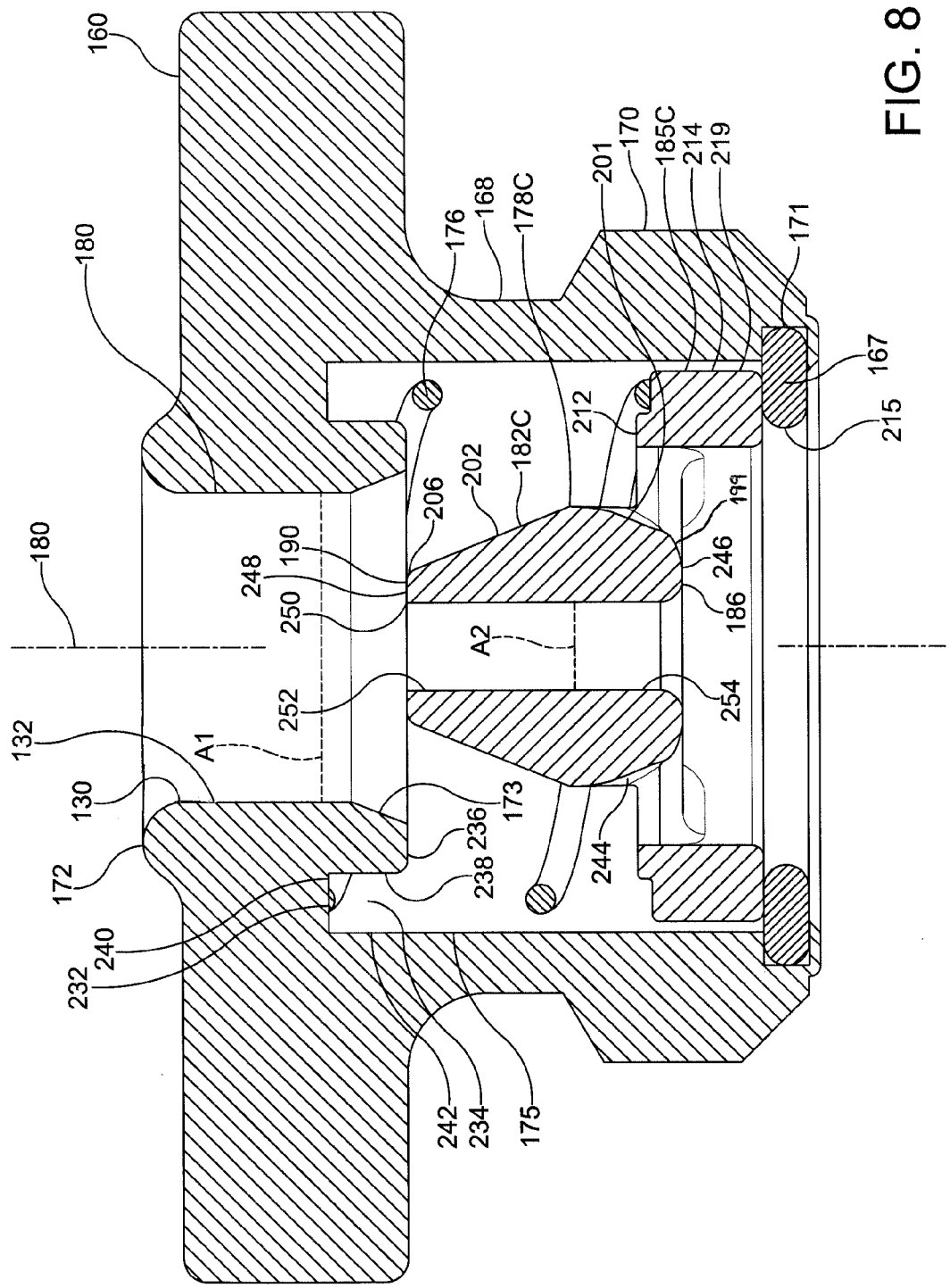
FIG. 8 is a cross-sectional view of the valve member of FIG. 7 and another embodiment of a first housing suitable for in the valve assemblies of FIGS. 1 and 4.
Figure 9:
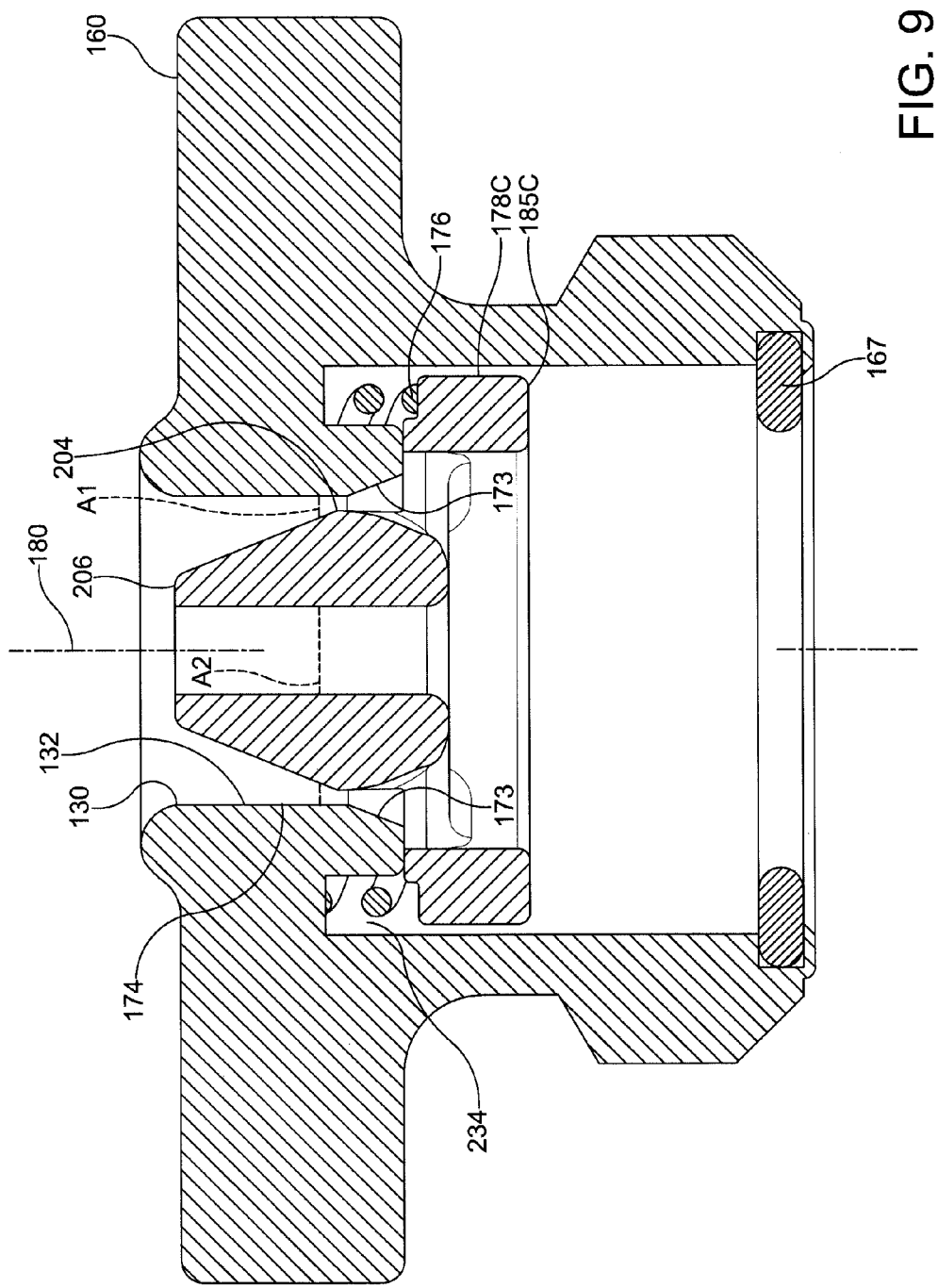
FIG. 9 is another cross-sectional view of the valve member and the first housing illustrated in FIG. 8 when the tire pressure is being decreased.

In the embodiments illustrated in FIGS. 7-9, the first housing 160 comprises an inner face 236. The wall portion 174 is attached to the inner face 236 on an end thereof. The inner face 236 is an annular portion and separates the first perforation 132 from the groove 234. At an outer edge thereof, the inner face 236 is attached to an inner wall portion 238. The inner wall portion 238 is attached to an upper wall portion 240 at an outer edge thereof. The upper wall portion 240 is substantially annular. The upper wall portion 240 is attached to an outer wall portion 242 at an outer edge thereof. The inner wall portion 238, upper wall portion 240 and outer wall portion 242 define the groove 234.

Referring back to FIG. 1, the valve assembly 100 comprises the biasing member 176. Preferably, the biasing member 176 is resilient and a spring such as, for example, a coil spring formed from a spring steel. The biasing member 176 is disposed adjacent the first perforation 132.

The biasing member 176 and a valve member 178, 178A, 178B, 178C are disposed within the cavity 134. The cavity 134 is defined by the receiving portion 110 and the first housing 160. The valve member 178, 178A, 178B, 187C is movable within the cavity 134 and first housing 160. In an embodiment, the valve member 178, 178A, 178B, 178C is slidably disposed within the cavity 134 and first housing 160. The biasing member 176 contacts the valve member 178, 178A, 178B, 178C and biases the valve member 178, 178A, 178B, 178C away from the first perforation 132 and toward the second port 128.

The fluid conduit 126 connects the tire port 124 to the second port 128 allowing the second fluid conduit 133, cavity 134, first perforation 132 and first port 130 to be in fluid communication with the wheel assembly. When the tire pressure is being decreased, the valve member 178, 178A, 178B, 178C is movable toward or away from the first port 130 in response to a flow of air from the second port 128. Generally, as the tire pressure decreases, the valve member 178, 178A, 178B, 178C moves away from the first port 130.

The first housing 160, biasing member 176, and valve member 178, 178A, 178B, 178C preferably share a common centerline 180. The second port 128 and tire port 124 may be offset from the centerline 180. The biasing member 176 is at least partially received by the second perforation 175 and in contact therewith. A portion of the biasing member 176 may be received by the valve member 178, 178A, 178B, 178C and portions of the valve member 178, 178A, 178B, 178C and biasing member 176 may be engaged.

As best shown in FIGS. 3, 5-6, and 7-8 the valve member 178, 178A, 178B, 178C comprises a first portion 182, 182A, 182B, 182C and a second portion 184, 185, 185C. The first portion 182, 182A, 182B, 182C and second portion 184, 185, 185C are concentric. The first portion 182, 182A, 182B, 182C is attached to the second portion 184, 185, 185C adjacent a first end 186 thereof. In an embodiment, the first portion 182, 182A, 182B, 182C has a diameter which is less than the second portion 184, 185, 185C.

The first portion 182, 182A, 182B, 182C comprises an outer surface 188 which is unbroken adjacent a second end 190 to allow a pressurized fluid to flow over it. The first port 130 communicates with the second port 128 via a flow pathway formed around the outer surface 188. The first portion 182, 182A, 182B, 182C has a diameter which gradually reduces toward the second end 190.

Figure 3:
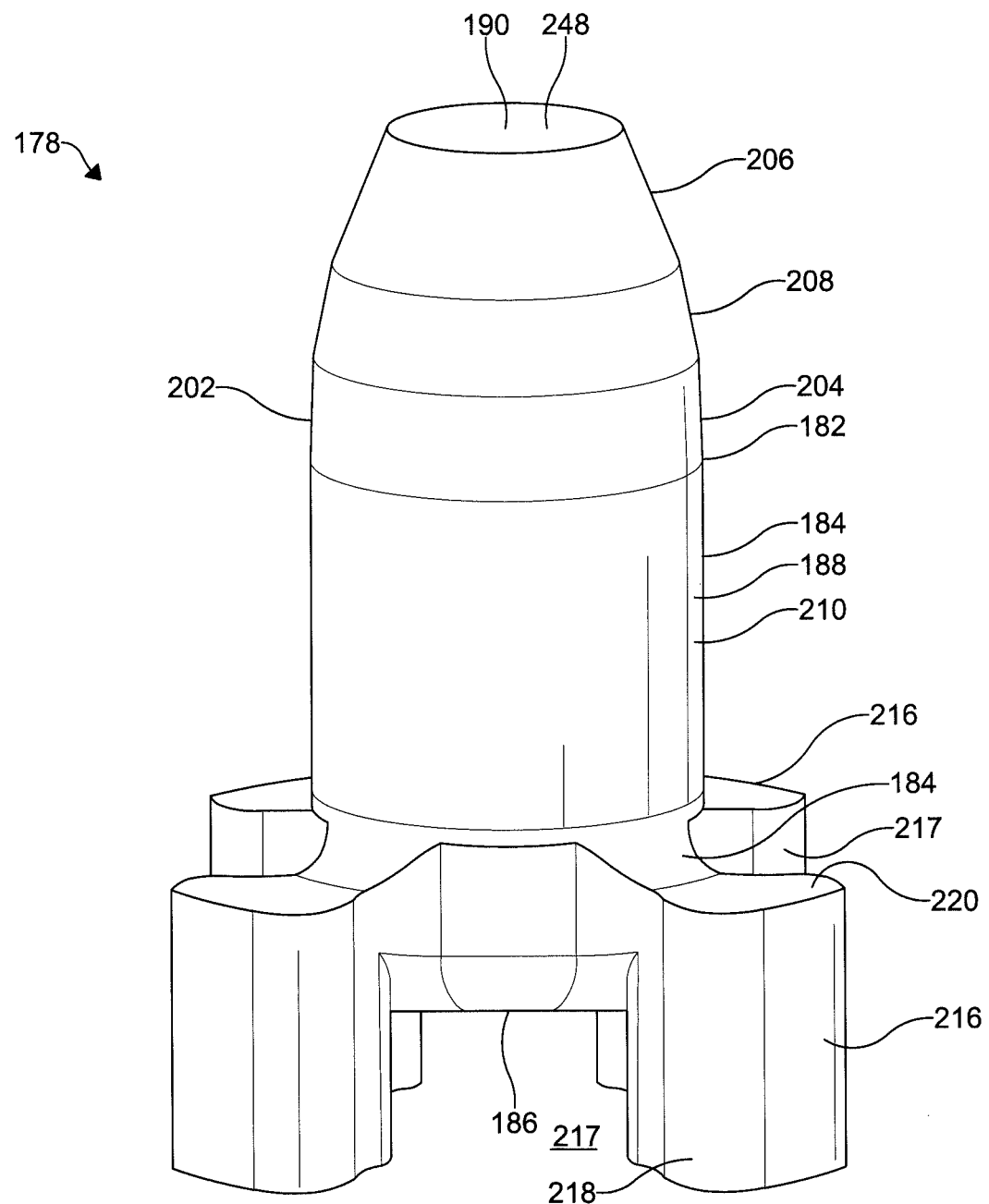
FIG. 3 is a perspective view of an embodiment of the valve member of the valve assembly of FIG. 1.
Figure 5:
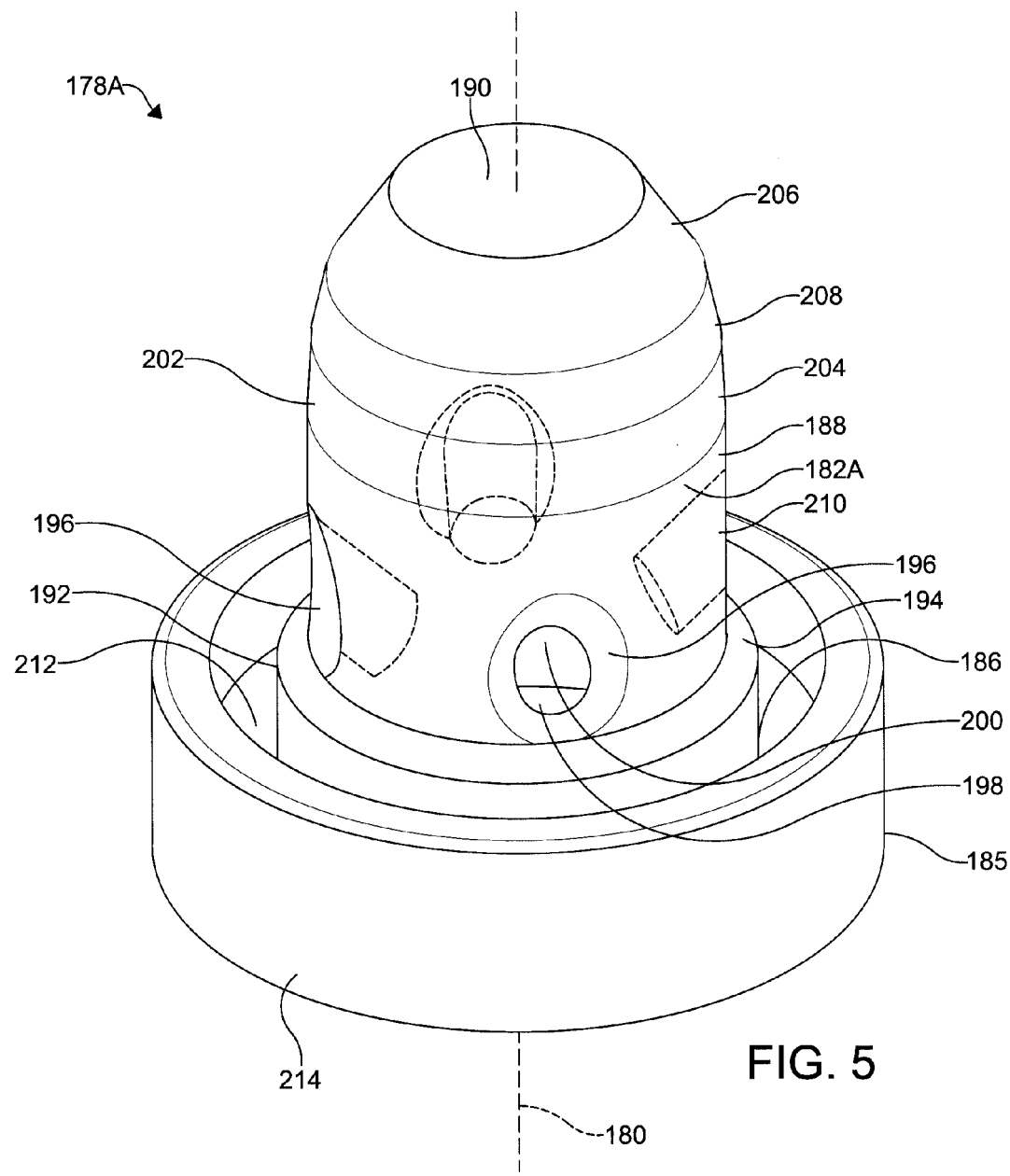
FIG. 5 is a perspective view of an embodiment of the valve member of the valve assembly of FIG. 4.
Figure 6:
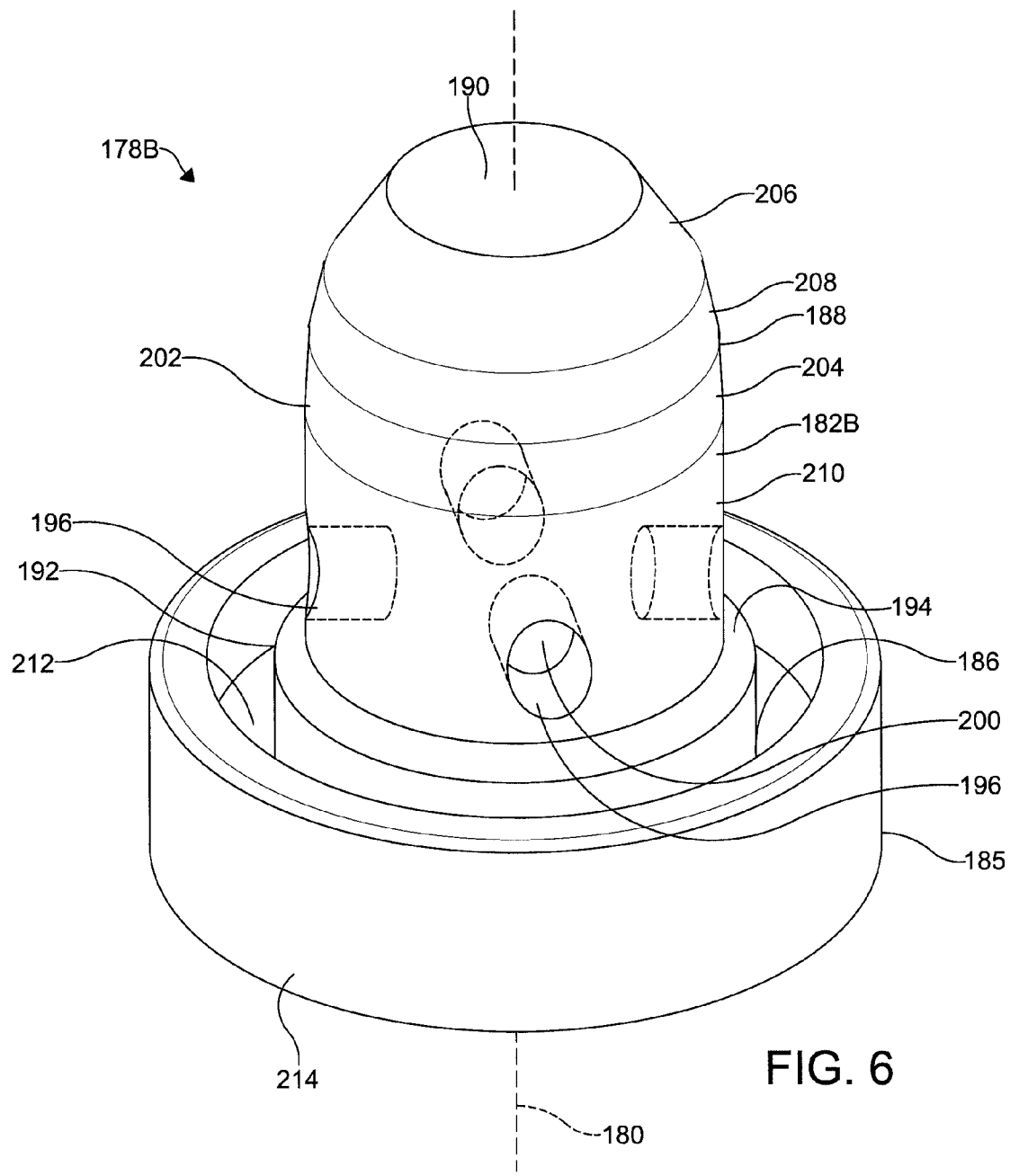
FIG. 6 is a perspective view of another embodiment of a valve member suitable for use in the valve assemblies of FIGS. 1 and 4.

As illustrated best in FIGS. 3, 5 and 6, the second end 190 may be sharply defined. In other embodiments, the second end may have a domed shape. The second end 190 comprises a second end surface 248. In an embodiment like the one illustrated in FIG. 3, the second end surface 248 is unbroken and of a generally circular shape. In other embodiments, such as the one shown in FIG. 7, the second end surface 248 has an annular shape and surrounds an opening 250. The opening 250 may be of a circular shape and in fluid communication with a channel 252 which extends through the first portion 182C from the second end 190 to the first end 186. In one embodiment, such as the one shown in FIG. 7, the first portion 182C can be a top frusto-conical first portion 182C having a continuous outer surface 188 allowing pressurized fluid to flow between the first housing 150 and the valve member 178C and through the channel 252.

The channel 252 allows for the communication of pressurized air from the second end 190 to the first end 186 and vice versa. When decreasing the tire pressure, the flow of pressurized air through at least a portion of the channel 252 is preferably non-turbulent. The channel 252 may have a generally cylindrical shape and be of a diameter 254 which is substantially constant adjacent the second end 190 of the first portion 182C. The diameter 254 may increase towards and adjacent the first end 186 of the first portion 182C.

An area A2 is formed in the channel 252. The area A2 is of a diameter and size which is constant. When the tire pressure is being decreased, the area A2 allows for a minimum flow capacity through the valve assembly 100. Preferably, when decreasing the tire pressure, the flow of pressurized air through the area A2 is non-turbulent.

Figure 4:
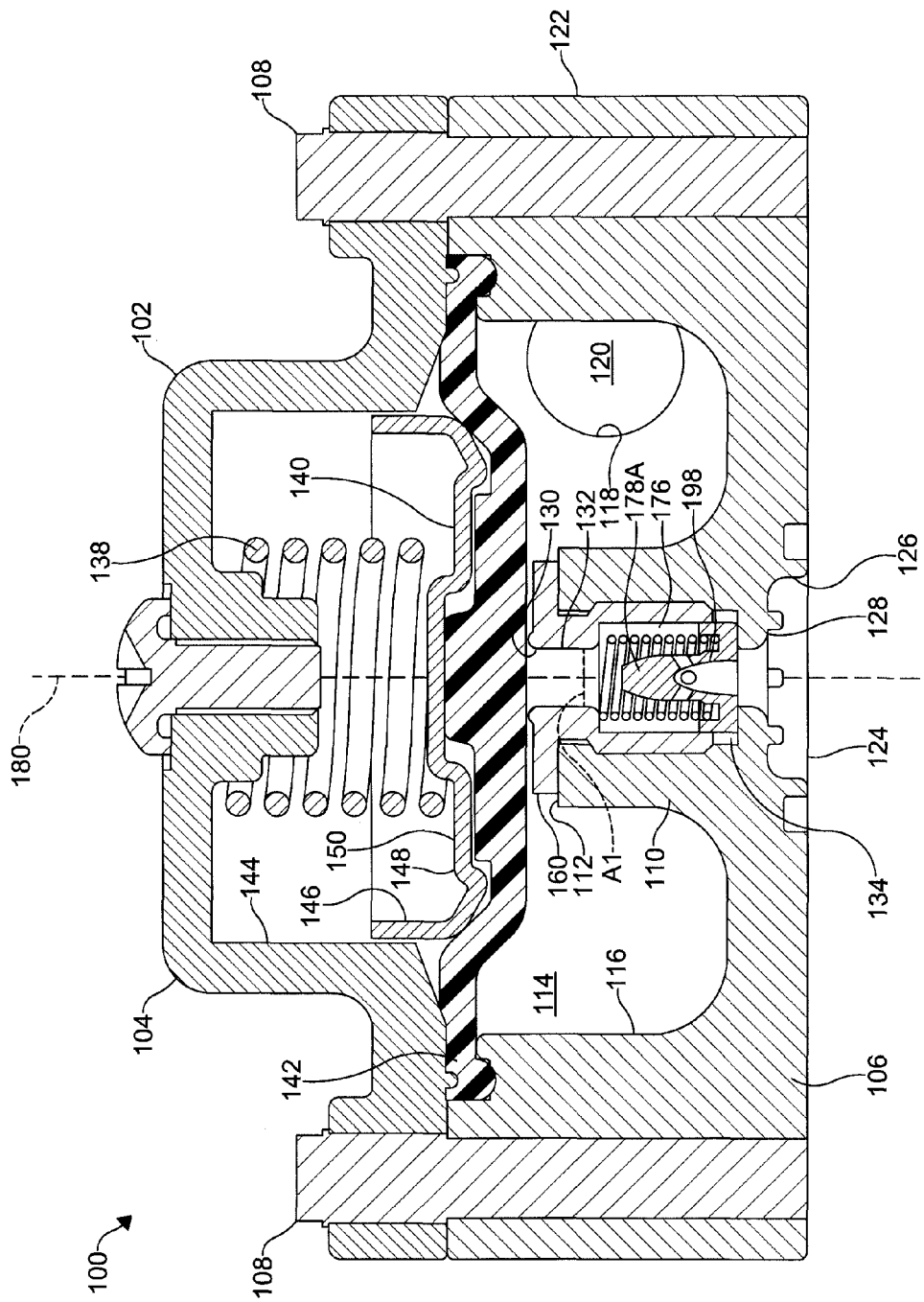
FIG. 4 is a cross-sectional view of another embodiment of the valve assembly in accordance with the invention.

In certain embodiments which are illustrated in FIGS. 4-6, the first end 186 is also attached to a first end portion 192. In this embodiment, the first end portion 192 is attached to a middle diameter portion 194. The first end portion 192 and middle diameter portion 196 may each be of an annular shape.

One or more openings 196 may be provided in a cylindrical portion 210. In the embodiments illustrated in FIGS. 4-6, the cylindrical portion 210 is which is attached to the middle diameter portion 194. As shown, the one or more openings 196 may comprise four openings. The one or more openings 196 extend from the outer surface 188 to a cavity portion 198 defined by an inner surface 200. The cavity portion 198 may increase in thickness towards the tire port 124. As shown in FIG. 6, the one or more openings 196 may be formed at right angles to each other and/or in a perpendicular relationship with the centerline 180 of the valve member 178B. In another embodiment which is shown in FIG. 5, the one or more openings 196 may be formed at an acute angle to the centerline 180 of the valve member 178A. As illustrated in FIG. 3, in other embodiments the valve member 178 comprises a first portion 182 which is unbroken to the second portion 184 such that the fluid directed through the valve assembly 100 flows around the first portion 182 rather than through one or more openings provided therein.

In other embodiments, such as those illustrated in FIGS. 7-9, a bottom rounded portion 199 having a continuous outer surface 244 is attached to the first end 186. The bottom rounded portion 199 is attached to a tapered portion 201. The tapered portion 201 separates the bottom rounded portion 199 from an orifice portion 202. The tapered portion 201 reduces in thickness towards the bottom rounded portion 199. Reducing the thickness of the tapered portion 201 decreases flow restrictions experienced by the pressurized air adjacent the tapered portion 201. The bottom rounded portion 199 and tapered portion 201 each comprise a curvilinear outer surface 244, 246.

The first portion 182, 182A, 182B, 182C also comprises the orifice portion 202. The orifice portion 104 comprises two or more discrete portions. In an embodiment, the orifice portion 202 comprises a first diameter portion 204 and a second diameter portion 206. In other embodiments, the orifice portion 202 also comprises an intermediate diameter portion 208. The first diameter portion 204 is of a diameter which is greater than that of the second diameter portion 206. The intermediate diameter portion 208 is of a diameter which is greater than that of the second diameter portion 206 and less than that of the first diameter portion 204.

The first diameter portion 204 is attached to the intermediate diameter portion 208 which is attached to the second diameter portion 206. The first diameter portion 204 may also be attached to and separate the intermediate diameter portion 208 and second diameter portion 204 from the cylindrical portion 210. The second diameter portion 206 is attached to the second end 190 of the first portion 182, 182A, 182B, 182C. The first diameter portion 204 and intermediate diameter portion 208 reduce in diameter toward the second diameter portion 204. The first diameter portion 204, intermediate diameter portion 208, and second diameter portion 206 may be each of a general frustoconical shape with each portion 204, 206, 208 gradually reducing in diameter toward the second end 190. Although not shown in the embodiments illustrated in FIGS. 7-9, the first portion 182C illustrated therein may also comprise an intermediate diameter as described above.

The second portion 184, 185, 185C may be disposed in the receiving portion 110. Under certain conditions, the second portion 185, 185C may contact the first housing 160 to provide a positive stop. In certain embodiments which are shown in FIGS. 4-9, the second portion 185 comprises a base 212 and a wall 214. The wall 214 is annular and is preferably disposed around the base 212. In the embodiments illustrated in FIGS. 4-6, the wall 214 also extends axially beyond the base 212 toward the first perforation 132. However, in the embodiments illustrated in FIGS. 7-9, the base 212 extends axially beyond the wall 214 toward the first perforation 132.

In other embodiments like those illustrated in FIGS. 8 and 9, the valve member 178C is held within the first housing 160 by the retaining ring 167. In these embodiments, an inner diameter 215 of the retaining ring 167 is smaller than an outer diameter 219 of the wall 212. Also, the outer diameter 219 of the wall 212 is greater than the diameter of the first perforation 132. However, the outer diameter 219 of the wall 212 is smaller than the diameter of the second perforation 175.

The base 212 is positioned adjacent the second port 128. The second portion 185, 185C receives a portion of the biasing member 176. In the embodiments illustrated in FIGS. 4-6, the biasing member 176 contacts the base 212 and is disposed between the wall 214 and the first end portion 192 of the valve member 178A, 178B. Also, in the embodiments illustrated in FIGS. 4-6, the base 212 is a solid member. In other embodiments such as those illustrated in FIGS. 7-9, the biasing member 176 contacts the wall 214 and is disposed around the base 212.

In the embodiments illustrated in FIGS. 7-9, one or more holes 213 are provided in the base 212 to allow pressurized air to flow therethrough. In these embodiments, three holes 213 may be provided. Each hole 213 is defined by one or more curvilinear surfaces 244 which reduces the amount of resistance experienced by the pressurized air flowing through the one or more holes 213.

The one or more holes 213 provide an area for pressurized air to flow through which is greater in size than the area A1. The size of the area A1 may vary depending on the tire pressure and the desired decrease in tire pressure. The size of the area A1 may increase as the tire pressure decreases to maintain or substantially maintain a selected flow capacity. Creating an area for the flow of pressurized air through the base 212 via the one or more holes 231 which is greater in size than the area A1 ensures that the area A1 is the location of restricted flow through the valve assembly 100.

In other embodiments like the one shown in FIG. 3, the second portion 184 comprises one or more supports 216. The supports 216 are attached to, disposed about and extend radially beyond the first portion 182. Preferably, the supports 216 are equally spaced apart. Each support 216 may have a generally wedge-shaped portion 218. Each of the supports 216 comprises an upper edge 220 that is sharply defined. A definition of the upper edges 220 may be defined by the process used to form the supports 216. When the tire pressure is being adjusted, spaces 228 between successive shuttle supports 216 form a portion of a flow pathway through the valve assembly 100.

Each of the supports 216 is positioned adjacent a lower wall portion 226 and the second port 128. The supports 216 define an outer diameter 222 of the valve member 178. As shown in FIG. 1, the outer diameter 222 is smaller than an inner diameter 224 of the first housing 160.

The valve assembly 100 comprises the area A1. When the tire pressure is being decreased, the area A1 allows the valve assembly 100 to provide a selected flow capacity therethrough. In the embodiments illustrated in FIGS. 1-6, the flow capacity through the valve assembly 100 is equal to the flow capacity through the area A1. In the embodiments illustrated in FIGS. 7-9, the flow capacity through the valve assembly 100 is equal to the flow capacity through the area A1 and the flow capacity through the area A2. In the embodiments illustrated in FIGS. 1-6, the area A1 has a flow capacity when the tire pressure is being decreased which provides the pressure necessary for the valve assembly 100 to remain open and to close when the selected tire pressure is achieved. In the embodiments illustrated in FIGS. 7-9, the area A1 and the area A2 have flow capacities when the tire pressure is being decreased which provide the pressure necessary for the valve assembly 100 to remain open and to close when the selected tire pressure is achieved.

Figure 16:
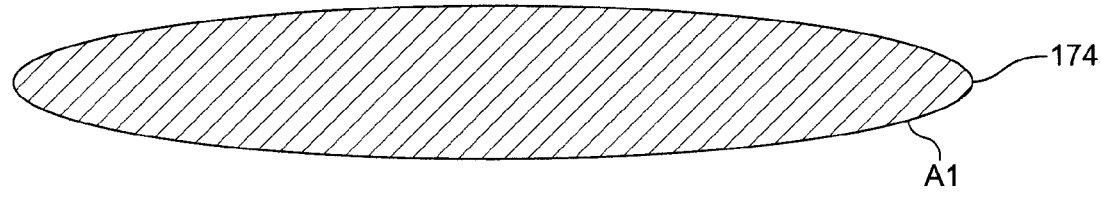
FIG. 16 is a perspective view of an area within the valve assembly of FIG. 1 or the area when the tire pressure is low and being decreased.

The area A1 is formed in the first perforation 132. The area A1 is at least partially defined by the wall portion 174 of the first housing 160. Area A1 is illustrated in FIG. 16 when it is defined solely by the wall portion 174. Area A1 is defined solely by the wall portion 174 when the tire pressure is not being decreased or when the tire pressure is being decreased but is low. When the tire pressure is being decreased, the area A1 may also be defined by a portion 204, 206, 208 of the first portion 182, 182A, 182B, 182C.

Operation of the embodiments of the valve assembly 100 illustrated in FIGS. 1-9 when the tire pressure is decreased will now be described utilizing FIGS. 10-16.

Figure 10:
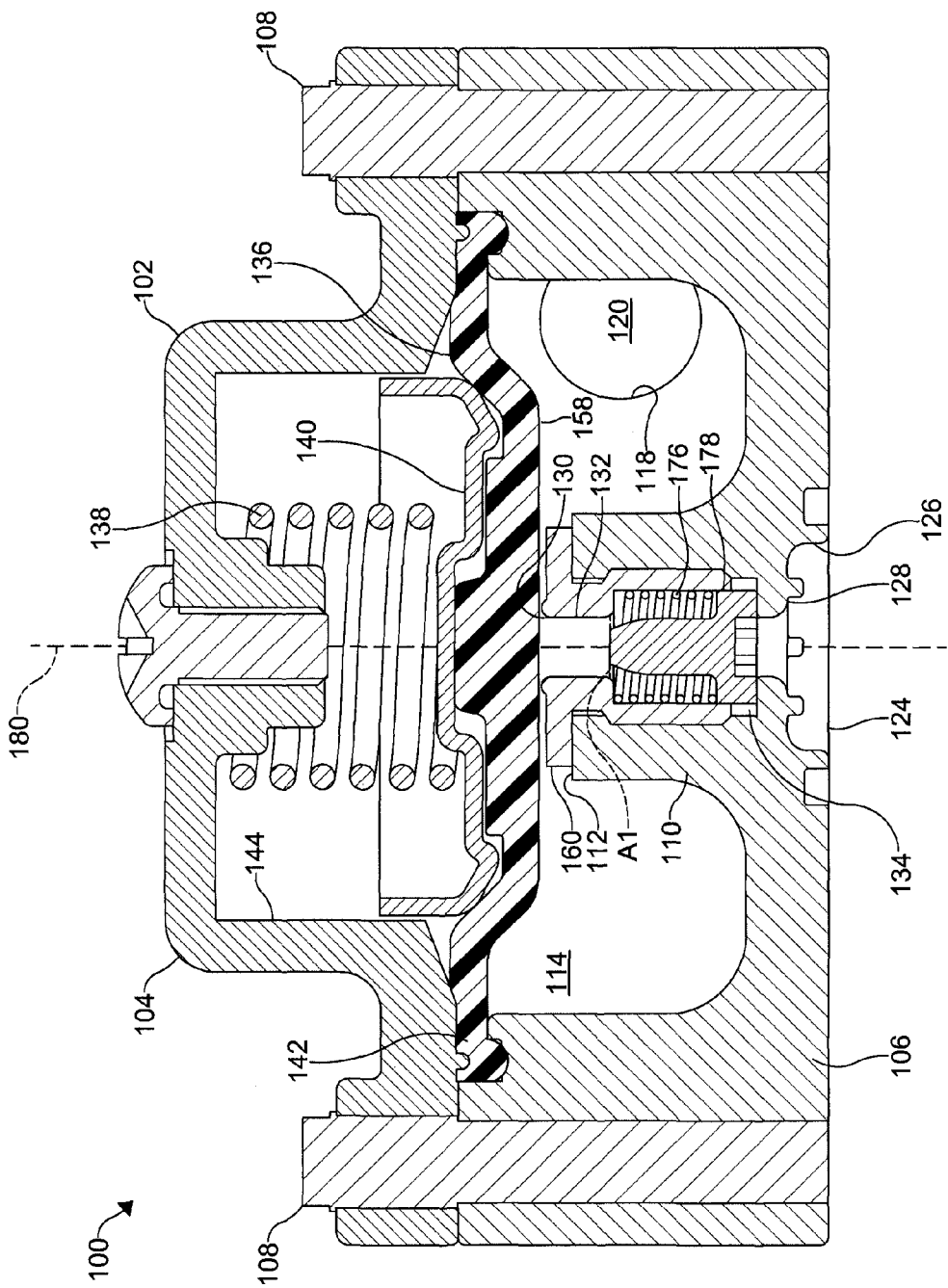
FIG. 10 is a cross-sectional view of an embodiment of the valve assembly of FIG. 1 when the tire pressure is being decreased.
Figure 11:
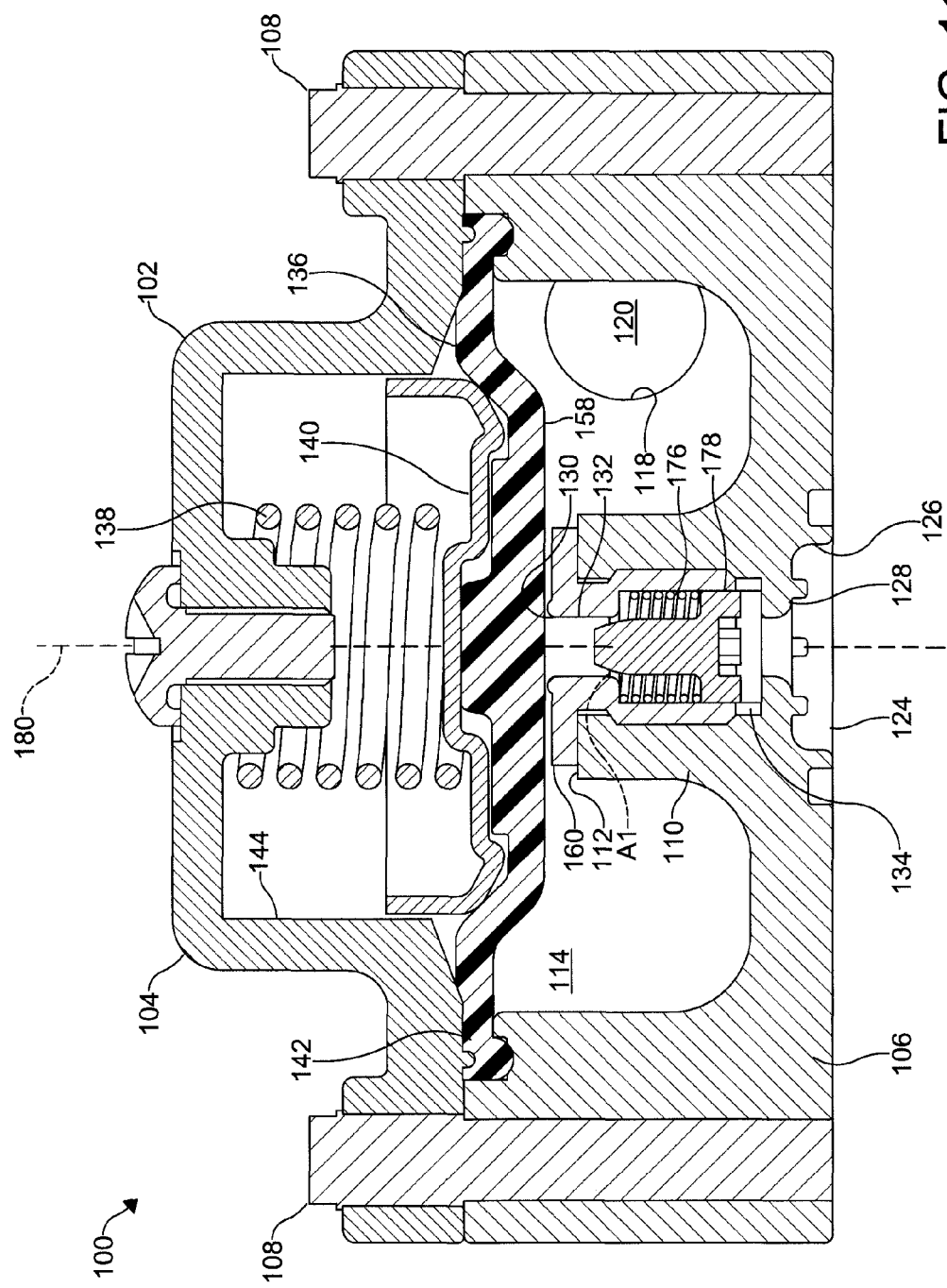
FIG. 11 is a cross-sectional view of an embodiment of the valve assembly of FIG. 1 when the tire pressure is being decreased.
Figure 12:
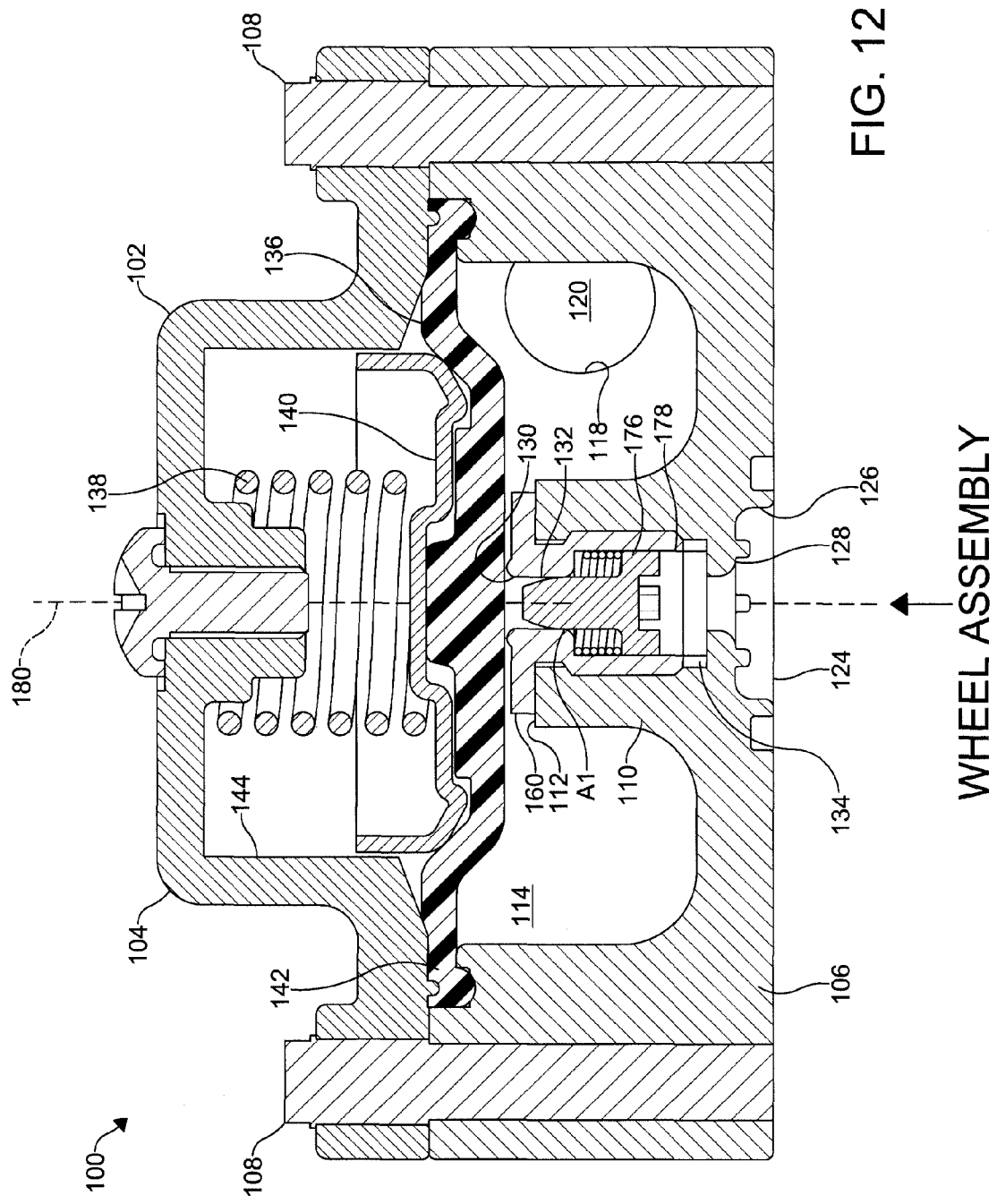
FIG. 12 is a cross-sectional view of an embodiment of the valve assembly of FIG. 1 when the tire pressure is being decreased.

To decrease the tire pressure, a flow of air is directed to the valve assembly 100 from the air compressor. The flow of air is at a pressure which is greater than the tire pressure. The flow of air enters the major chamber 114 from the control port 118 via the major fluid conduit 120. The flow of air moves the valve device 136 to the open position by biasing the diaphragm portion 142 away from the tire port 124 as is shown in FIGS. 10-12.

Once the valve device 136 is in the open position, fluid communication between the air compressor and valve assembly 100 is stopped and the flow of air from the air compressor is discontinued. Next, air enters the valve assembly 100 from the wheel assembly through the tire port 124. From the tire port 124, the pressurized air flows through the cavity 134 via the second port 128 and fluid conduits 126, 133 around the valve member 178 through the first perforation 132 to the first port 130, and to the major chamber 114 and out the control port 118.

When the pressurized air from the wheel assembly flows through the cavity 134, the pressurized air provides a bias to the valve member 178. The bias provided by the pressurized air opposes the bias provided by the biasing member 176 which urges the valve member 178 toward the first perforation 132. As shown in FIGS. 10-12, urging the valve member 178 toward the first perforation 132 compresses the biasing member 176 and may position the valve member 178 within the first perforation 132. When the valve member 178 is positioned within the first perforation 132, a portion 204-208 of the first portion 182 also defines the area A1. As the tire pressure decreases, the bias provided to the valve member 178 by the pressurized air is reduced and the biasing member 76 urges the valve member 178 back toward the tire port 124.

The tire pressure determines which portion 204-208 of the first portion 182, if any, is received by the first perforation 132. Thus, when the tire pressure is decreased, area A1 may vary in size depending on the initial tire pressure and the selected tire pressure. When the tire pressure is high as described below and represented in FIG. 13, the area A1 is smaller than when the tire pressure is lower as described below for and illustrated by FIGS. 14-16. Also, as is illustrated by FIGS. 13-16, the size of the area A1 increases as the tire pressure decreases. Increasing the size of the area A1 as the tire pressure decreases allows the flow capacity through area A1 to remain substantially constant.

Referring now to FIGS. 13-16, the area A1 will be described with reference to certain tire pressure conditions and the tire pressure decreasing.

Figure 13:
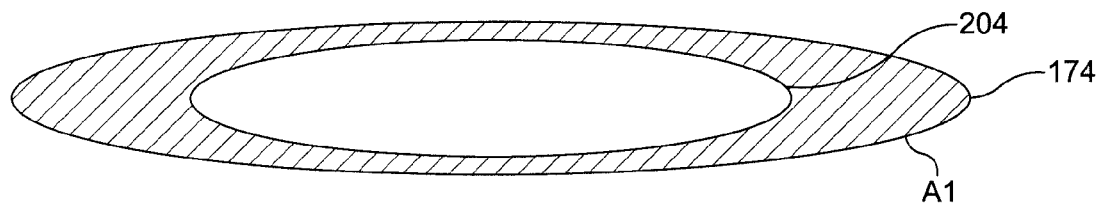
FIG. 13 is a perspective view of an area within the valve assembly of FIG. 12.
Figure 14:
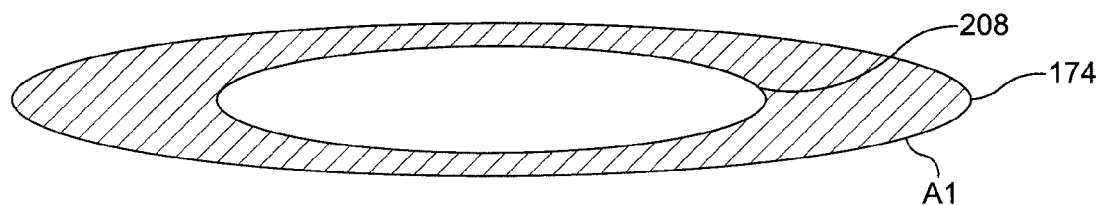
FIG. 14 is a perspective view of an area within the valve assembly of FIG. 11.
Figure 15:
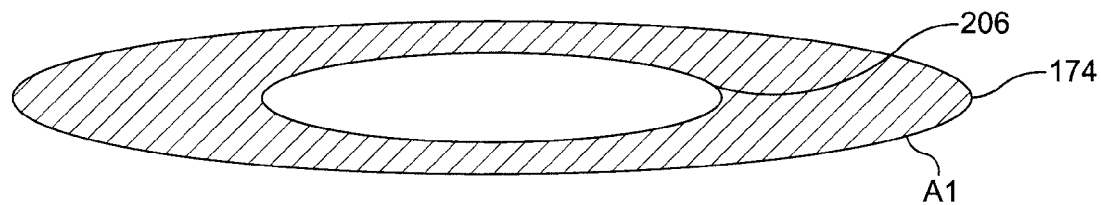
FIG. 15 is a perspective view of an area within the valve assembly of FIG. 10.

A representation of a high tire pressure condition is illustrated in FIG. 13. Under a high tire pressure condition such as, for example, a tire pressure of 150 psi, the first diameter portion 204 is received by the first perforation 132 and the area A1 is defined by the first diameter portion 204 and the wall portion 174. FIG. 14 illustrates area A1 when tire pressure is lower than under the tire pressure condition described above and illustrated by FIG. 13. In this embodiment, the intermediate diameter portion 208 is received by the first perforation 132 and the area A1 is defined by the intermediate diameter portion 208 and the wall portion 174. FIG. 15 illustrates area A1 when tire pressure is lower than under the conditions described above and illustrated by FIGS. 13 and 14. In this embodiment, the second diameter portion 206 is received by the first perforation 132 and the area A1 is defined by the second diameter portion 206 and the wall portion 174. FIG. 16 illustrates area A1 when tire pressure is not being decreased or is lower than the tire pressure conditions described above and illustrated by FIGS. 13-15. As illustrated in FIG. 16, the first portion 182 is not received by the first perforation 132. Under the conditions described above and illustrated by FIG. 16, the bias provided by the pressurized air is not greater than the opposing bias provided by the biasing member 176 to the valve member 178. Instead, the first portion 182 is received by the second perforation 175 and the area A1 is defined solely by the wall portion 174 of the first housing 160.

In the embodiments of the valve assembly 300, 500 illustrated in FIGS. 17-23, the valve assembly 300, 500 is not attached to the wheel assembly. In these embodiments, the valve assembly 300, 500 is provided at another portion of the vehicle and attached to a pneumatic control unit 310, 512 of the central tire inflation system. However, the embodiments of the valve assembly 300, 500 still allow for an optimized decrease in tire pressure and may also facilitate venting the central tire inflation system. In these embodiments, when the tire pressure is being decreased, the valve assembly 300, 500 is configured to control pressure in one or more portions of the tire inflation system.

The embodiments of the valve assembly 300, 500 will be described for use in decreasing the tire pressure of one wheel assembly. However, the valve assembly and central tire inflation system are not so limited. Thus, the valve assembly and central tire inflation system may be utilized to simultaneously decrease the tire pressures of more than one wheel assembly.

Figure 17:
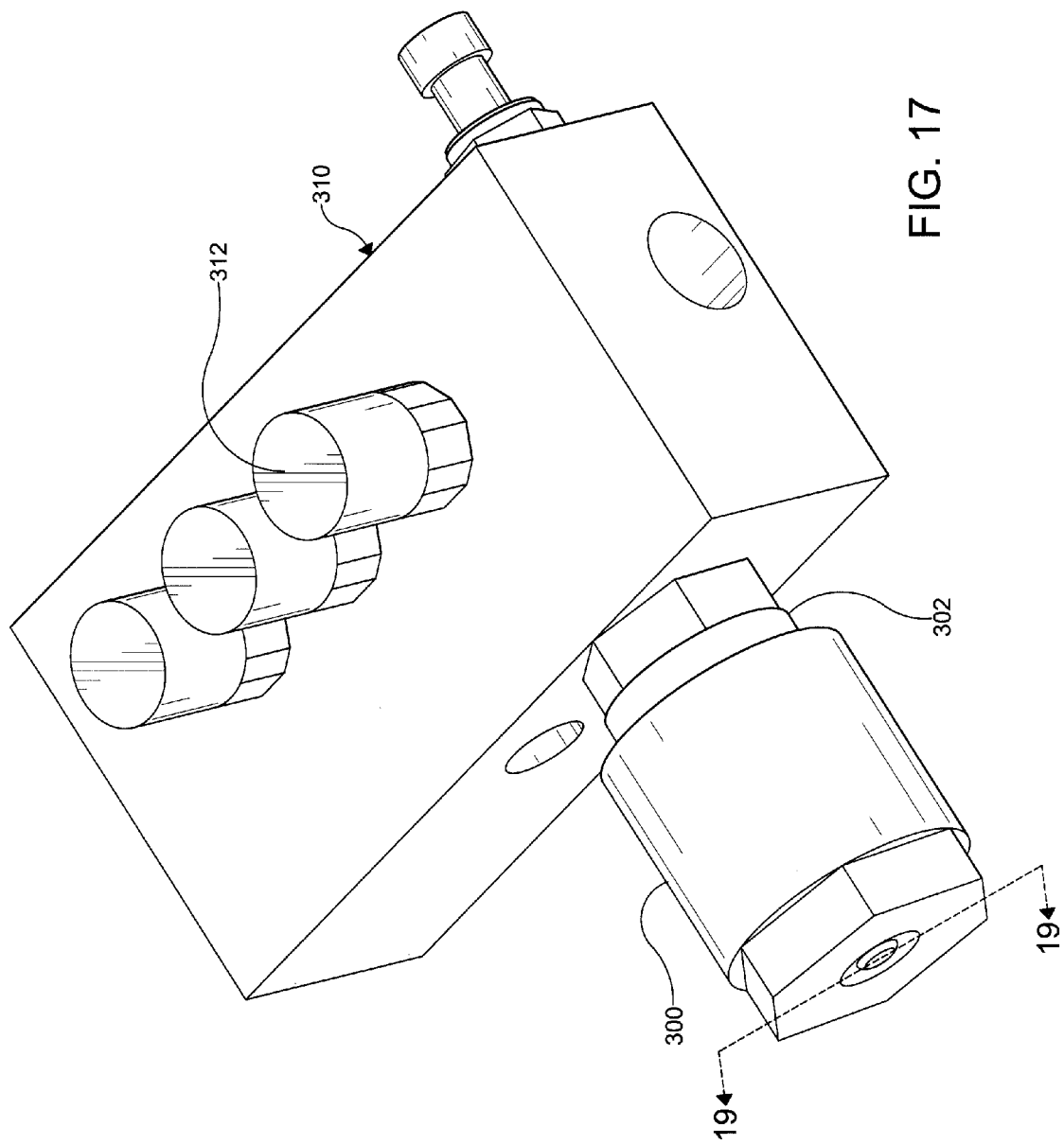
FIG. 17 is a perspective view of another embodiment of the valve assembly in accordance with the invention which is shown attached to a pneumatic control unit.

Embodiments of the valve assembly 300 will now be described with reference to FIGS. 17-19. Certain embodiments of the valve assembly 300 may be as described above for embodiments of the valve assembly 100 illustrated in FIGS. 1-16.

The valve assembly 300 comprises a first housing 302. The first housing 302 has a first port 304 connected to a second port 306 via a cavity 308. In these embodiments, the second port 306 is selectively in fluid communication with a wheel assembly. The wheel assembly is as above-described. The second port 306 is in fluid communication with the wheel assembly when the tire pressure of the wheel assembly is being decreased.

The valve assembly 300 via the second port 306 is in fluid communication with a port formed in the pneumatic control unit 310. The valve assembly 300 is selectively in fluid communication with the wheel assembly via the second port 306, pneumatic control unit 310 and other portions of the central tire inflation system. In these embodiments, a valve device 312 is in fluid communication with the valve assembly 300 and the pneumatic control unit 310. The valve device 312 is operable from an open position to a closed position and vice versa. The valve device 312 allows or prevents fluid communication between the valve assembly 300 and pneumatic control unit 310. Fluid communication between the valve assembly 300 and the pneumatic control unit 310 is achieved by placing the valve device 312 in the open position.

In the open position, the valve device 312 allows the valve assembly 300 via the pneumatic control unit 310 to vent a portion of the tire inflation system or communicate with the wheel assembly to decrease the tire pressure thereof as described above. In the open position, the valve device 312 allows fluid communication between the valve assembly 300 and a source of pressurized air such as the wheel assembly. In the closed position, the valve device prevents fluid communication between the valve assembly 300 and a source of pressurized air such as an air compressor. As illustrated in FIG. 14, the valve device 312 is preferably of the solenoid variety. It is also preferred that the valve device 312 is normally in the open position.

Figure 18:
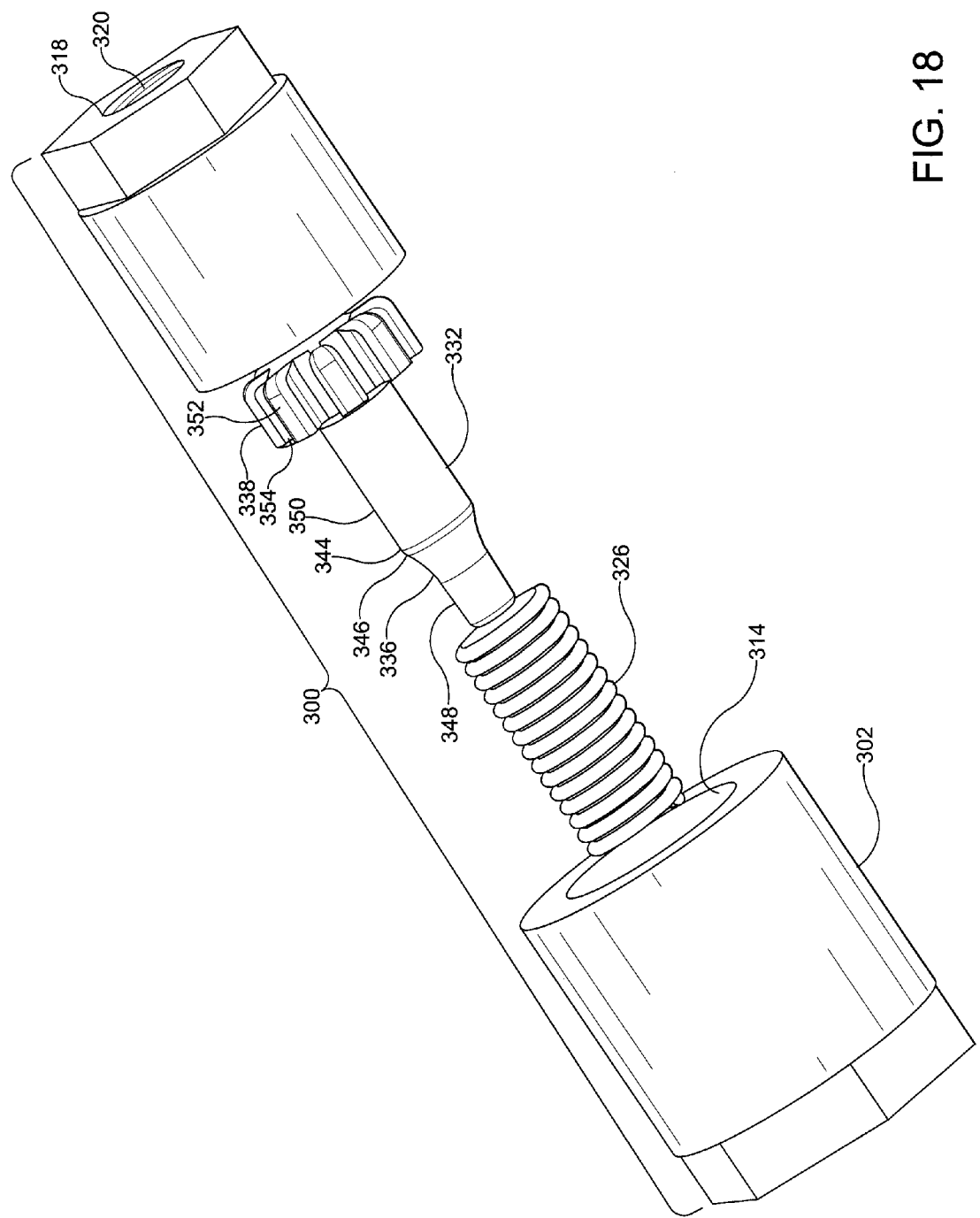
FIG. 18 is an exploded perspective view of the valve assembly of FIG. 17.
Figure 19:
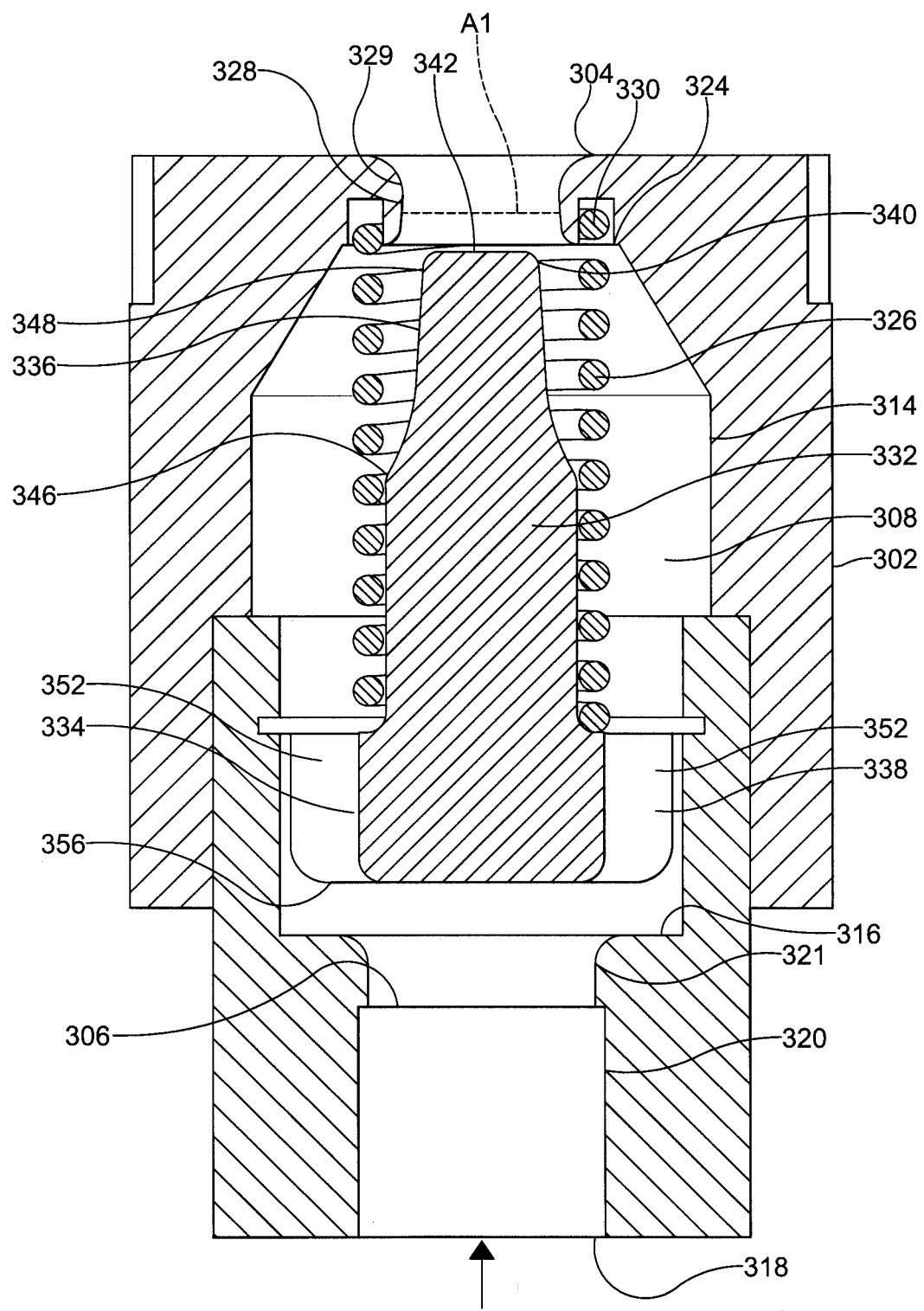
FIG. 19 is a cross-sectional view of the valve assembly of FIG. 17.
Figure 20:
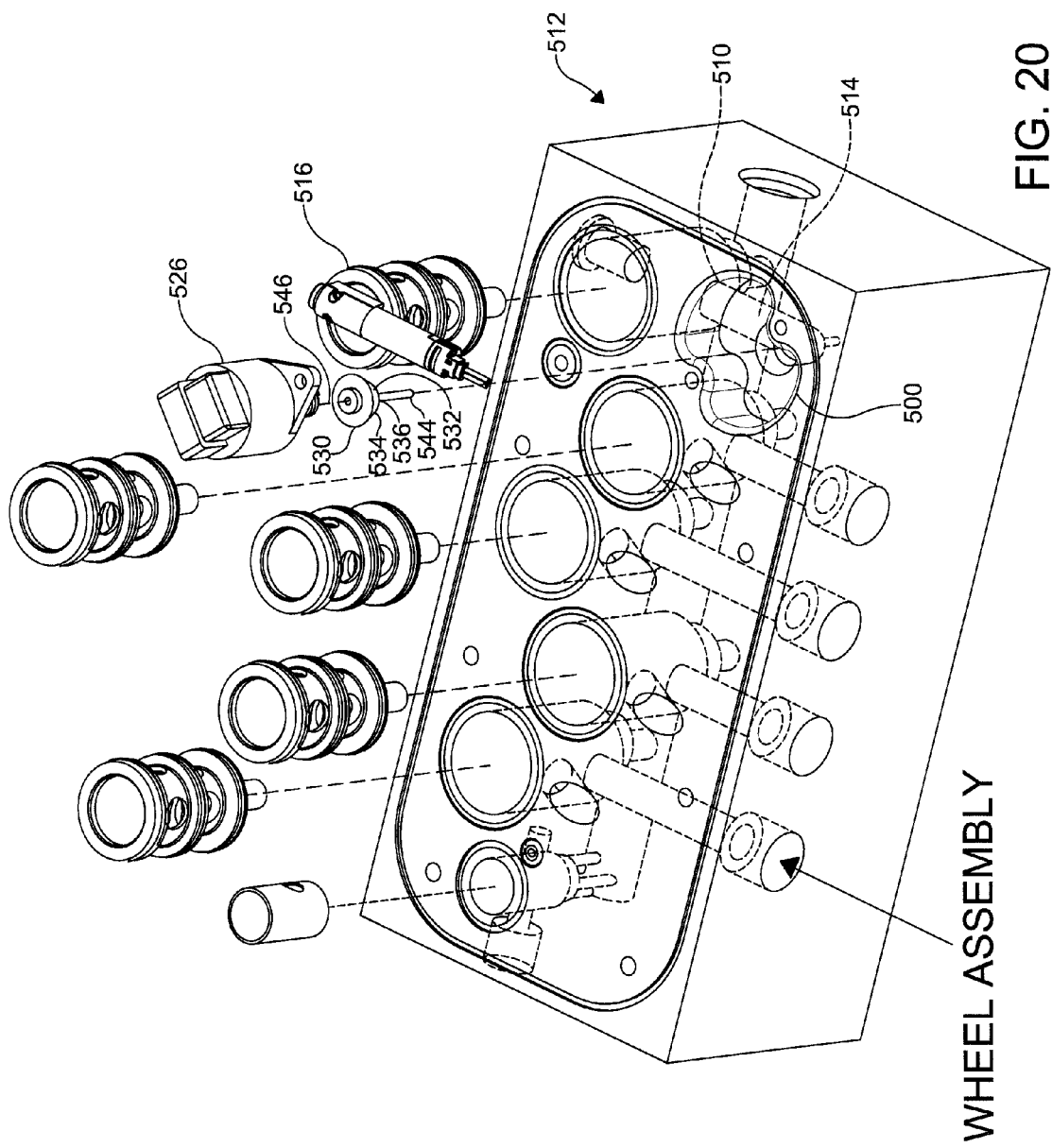
FIG. 20 is an exploded perspective view of another embodiment of the valve assembly in accordance with the invention and portions of another pneumatic control unit.

Referring now to FIGS. 18-19, the cavity 308 is defined by inner surfaces 314 of the first housing 302. The cavity 308 may have a generally cylindrical shape. The second port 306 is in fluid communication with the cavity 308 on an end 316 thereof. The second port 306 is connected to and in fluid communication with a tire port 318 via a fluid conduit 320 formed in the first housing 302. A second fluid conduit 321 connects the second port 306 to the cavity 308. When the valve device 312 is in the open position and the tire pressure is being decreased, the wheel assembly is in fluid communication with the second port 306 via the tire port 318, the fluid conduit 320 and the second fluid conduit 321. The fluid conduit 320 preferably has a threaded connection portion for attaching the valve assembly 300 to the pneumatic control unit 310.

On an opposite end 324, the cavity 308 is in fluid communication with the first port 304. In these embodiments, the first port 304 is also in fluid communication with the atmosphere. Air within the wheel assembly is expelled through the first port 304 when the tire pressure is being decreased. Also, pressurized air within the central tire inflation system is expelled through the first port 304 when venting the system.

A biasing member 326 is disposed in the cavity 308 adjacent a first perforation 328. The first perforation 328 is positioned between the first port 304 and the cavity 308 and is in fluid communication therewith. The first perforation 328 is formed in the first housing 302 and is preferably as described above for the embodiments of the valve assembly 100 illustrated in FIGS. 1-16. The first perforation 328 is defined by a wall portion 329.

An end 330 of the biasing member 326 contacts the inner surface 314 of the first housing 302 adjacent the first perforation 328. Preferably, the biasing member 228 is as described above and a spring such as, for example, a coil spring which operates as described above for the embodiments of the valve assembly 100 illustrated in FIGS. 1-16.

A valve member 332 is also disposed in the cavity 308 and is contacted by an end 334 of the biasing member 326. A portion of the biasing member 326 and a portion of the valve member 332 are engaged. The tire port 318, second port 306, valve member 332, biasing member 326, first perforation 328 and first port 304 are axially aligned.

The valve member 332 may be as described above for the embodiments of the valve assembly 100 illustrated in FIGS. 1-16. The valve member 332 comprises a first portion 336 and a second portion 338. In an embodiment, the first portion 336 has a diameter which is less than the second portion 338. The first perforation 328 is sized to receive the first portion 336. The first portion 336 has an outer surface 340 which is unbroken adjacent an end 342 to allow a pressurized fluid to flow around it. The first portion 336 reduces in diameter toward the end 342 thereof.

The first portion 336 comprises an orifice portion 344. The orifice portion 344 may be as described above for the embodiments of the valve assembly 100 illustrated in FIGS. 1-16. The orifice portion 344 comprises a first diameter portion 346 and a second diameter portion 348. The first diameter portion 346 has a diameter which is greater than the small diameter portion 348. The first diameter portion 346 and the second diameter portion 348 gradually reduce in diameter toward the end 342 of the first portion 336. As the first portion 336 gradually reduces in diameter, the flow rate through the valve assembly 300 does not rapidly drop even as the tire pressure is decreased over time as described above. A cylindrical portion 350 is attached to the first diameter portion 346 on an end and the second portion 338 on an opposite end.

The second portion 338 may be as described above for the embodiments of the valve assembly 100 illustrated in FIGS. 1-16. In the embodiments illustrated in FIGS. 17-19, the second portion 338 comprises a plurality of supports 352 which are circumferentially and equally spaced apart. Each support 352 extends from the first portion 336. The supports 352 contact the inner surface 314 of the first housing 302 and are positioned adjacent the second port 306. Preferably, the supports 352 are similarly sized and spaced apart. A space 354 is provided between adjacent supports 352 and sized to allow a desired amount of air to flow therethrough. Preferably, the spaces 354 are similarly sized. The valve member 332 may also comprise at least one spacer (not depicted) provided on an end surface 356 of each support 352. The spacer(s) provide gaps between the inner surface 314 of the first housing 302 and the second portion 338.

The valve assembly 300 comprises an area A1. The area A1 may be as described above for the embodiments of the valve assembly 100 illustrated in FIGS. 1-16 and the area A1 described above for the embodiments of the valve assembly 100 may be as described below. The size of area A1 varies between embodiments of the valve assembly 300. The area A1 is at least partially defined by the wall portion 329 which defines the first perforation 328.

The flow capacity through area A1 can be selected. Preferably, for the embodiments of the valve assembly 300, 500 illustrated in FIGS. 17-23, the area A1 has a flow capacity which is less than a flow capacity through another portion of the system such as, for example, a wheel valve. Preferably, the area A1 has a flow capacity which is less than the flow capacity through a selected area of the wheel valve. Since the area A1 has a flow capacity which is less than a flow capacity through the wheel valve, the pressure necessary for the wheel valve to remain open when the tire pressure is being decreased is provided.

When tire pressure is being decreased or pressure within the system is being vented, pressurized air enters the valve assembly 300 through the second port 306 and flows through the cavity 308 to the first port 304 via a flow pathway formed around the first portion 336. The pressurized air entering the cavity 308 provides a bias to the valve member 332 which opposes the bias provided by the biasing member 326 and urges the valve member 332 toward the biasing member 326 and the first port 304 as described above. As described above, under certain tire pressure conditions, the valve member 332 is urged toward the first port 304, the biasing member 326 is compressed and the valve member 332 is received by the first perforation 328. When the first perforation 328 receives the valve member 332, the area A1 is defined by a portion 346, 348 of the first portion 336 and wall portion 329.

As the tire pressure decreases, the bias provided by the pressurized air is reduced. As the bias is reduced, the biasing member 326 urges the valve member 332 back toward the second port 306 as described above. As the valve member 332 moves toward the second port 306, the area A1 increases in size. For example, when defined by the second diameter portion 348, the area A1 is of a size which is larger than when it is defined by the first diameter portion 346. As the size of area A1 increases, the flow capacity through area A1 and the pressure desired in a selected portion of the tire inflation system can remain substantially constant even though the tire pressure is reduced.

Embodiments of the valve assembly 500 will be described with reference to FIGS. 20-23. Certain embodiments of the valve assembly 500 may be as described above for embodiments of the valve assemblies 100, 300 illustrated in FIGS. 1-19.

The valve assembly 500 comprises a first housing 502. The first housing 502 has a first port 504 connected to a second port 506 via a cavity 508. In this embodiment, the second port 506 is selectively in fluid communication with a wheel assembly. The wheel assembly is as described above. However, it should be appreciated that the valve assembly 500 may selectively communicate with each wheel valve assembly in fluid communication with the central tire inflation system. The second port 506 is in fluid communication with the wheel assembly when the tire pressure of the wheel assembly is being decreased.

The valve assembly 500 via the second port 506 is in fluid communication with a tire port 510 formed in a pneumatic control unit 512. In these embodiments, the first housing 502, second port 506, tire port 510 are formed in a unitary manner with the pneumatic control unit 512. A fluid conduit 514 is formed in the pneumatic control unit 512 and connects the ports 506, 510 to enable fluid communication between the valve assembly 500 and a valve device 516.

The valve assembly 500 is selectively in fluid communication with the wheel assembly via the valve device 516, pneumatic control unit 512 and other portions of the central tire inflation system. The valve device 516 may be as described above for the embodiments of the valve assembly 300 illustrated in FIGS. 17-19. The valve device 516 is operable from an open position to a closed position and vice versa. The valve device 516 selectively allows and prevents fluid communication between the valve assembly 500 and the pneumatic control unit 512 and other portions of tire inflation system. Fluid communication between the valve assembly 500 and pneumatic control unit 512 is achieved by placing the valve device 516 in the open position.

In the open position, the valve device 516 may allow the valve assembly 500 via the pneumatic control unit 512 to vent a portion of the tire inflation system or communicate with the wheel assembly to decrease the tire pressure thereof. Also, in the open position, the valve device 516 allows fluid communication between the valve assembly 500 and a source of pressurized air such as the wheel assembly. In the closed position, the valve device 516 prevents fluid communication between the valve assembly 500 and a source of pressurized air such as an air compressor. In these embodiments, the valve device 516 is preferably of the solenoid variety. It is also preferred that the valve device 516 is normally in the open position.

The cavity 508 is defined by inner surfaces 516 of the first housing 502. The cavity 508 may have a generally cylindrical shape in cross-section. The second port 506 is in fluid communication with the cavity 508 via a first perforation 518.

On an opposite end 520, the cavity 508 is in fluid communication with the first port 504. The first port 504 may be as described above for the embodiments of the valve assembly 300 illustrated in FIGS. 17-19. The first port 504 is in fluid communication with the atmosphere. Air within the wheel assembly is expelled to the atmosphere through the first port 504 when the tire pressure is being reduced. Also, air within the central tire inflation system is expelled through the first port 504 when pressure within the system is being vented as described above.

A biasing member 522 is disposed in the cavity 508 adjacent the first perforation 518. The first perforation 518 is formed in the first housing 502. The first perforation 518 is in fluid communication with the fluid conduit 514 via the second port 506. The first perforation 518 comprises a wall portion 524 which at least partially defines an area A1. In these embodiments, the first perforation 518 is tapered and reduces in thickness toward the second port 506.

In these embodiments, the first perforation 518 separates the cavity 508 from the fluid conduit 514. Preferably, a motor assembly 526 is attached to the pneumatic control unit 512 and a portion thereof is received by the cavity 508. Preferably, the motor assembly 526 comprises a motor which is of the stepper variety.

Referring now to FIGS. 20-23, the biasing member 522 is disposed around a cylindrical shaft portion 528 which extends from the motor assembly 526 into the cavity 508. The motor assembly 526 incrementally extends and retracts the shaft portion 528. When the tire pressure is being decreased, the motor assembly 526 receives a signal which causes the shaft portion 528 to be extended or retracted. The shaft portion 528 is attached to a valve member 530 which is extended or retracted by the motor assembly 526 via the shaft portion 528. The valve member 530 is aligned with the shaft portion 528.

The valve member 530 comprises a first portion 532 which has an outer surface 534 which is unbroken to allow air to flow around it. The first portion 532 may have a generally frusto-conical shape and reduces in diameter toward an end 536 thereof. The first portion comprises an orifice portion 538. The orifice portion 538 may be as described above for the embodiments of the valve assembly 100, 300 illustrated in FIGS. 1-19. The first portion comprises a first diameter portion 540 and a second diameter portion 542. The second diameter portion 542 is provided adjacent the fluid conduit 514. In an embodiment, the first diameter portion 540 has a diameter which is greater than a diameter of the second diameter portion 542. The second diameter portion 542 reduces in diameter toward the end 520 of the first portion 532.

The first portion 532 gradually reduces in diameter from the first diameter portion 540 to the second diameter portion 542. The reduction in diameter from the first diameter portion 540 to the second diameter portion 542 is of a steepness (relative to the centerline) which is selectable. Preferably, the steepness is selected based on the maximum tire pressure. For example, at a maximum tire pressure of 100 psi or more, the steepness may be selected to be greater than the steepness when the maximum tire pressure is less than 100 psi.

The area A1 is formed in the first perforation 518. The first portion 532 may be received by the first perforation 518. When received by the first perforation 518, a portion 540, 542 of the first portion 532 and wall portion 524 define the area A1 as described above. The area A1 may be as described above. The first portion 532 is positioned relative to the wall portion 524 to define the area A1.

When the tire pressure is being decreased, the wheel assembly is in fluid communication with a wheel valve which is preferably attached to the wheel assembly and selectively in fluid communication with the pneumatic control unit 512. As described above for the embodiments of the valve assembly 300 illustrated in FIGS. 17-19, air within the wheel assembly flows through the area A1 when the tire pressure is being decreased. As described above, the area A1 has a flow capacity which is less than the flow capacity through a selected area of the wheel valve. If two or more wheel assemblies are having their tire pressures decreased, the area A1 has a flow capacity which is less than the flow capacity through the sum of the selected areas of the wheel valves. In certain embodiments, area A1 has a flow capacity which is about 85 percent or less of the flow capacity through the selected area of the wheel valve. Preferably, area A1 has a flow capacity which is about 75 percent of the flow capacity through the selected area of the wheel valve. Since area A1 has a flow capacity which is less than the flow capacity through the selected area of the wheel valve, the pressure needed for the wheel valve or wheel valve assemblies to remain in the open position is provided as the tire pressure is being decreased.

Figure 21:
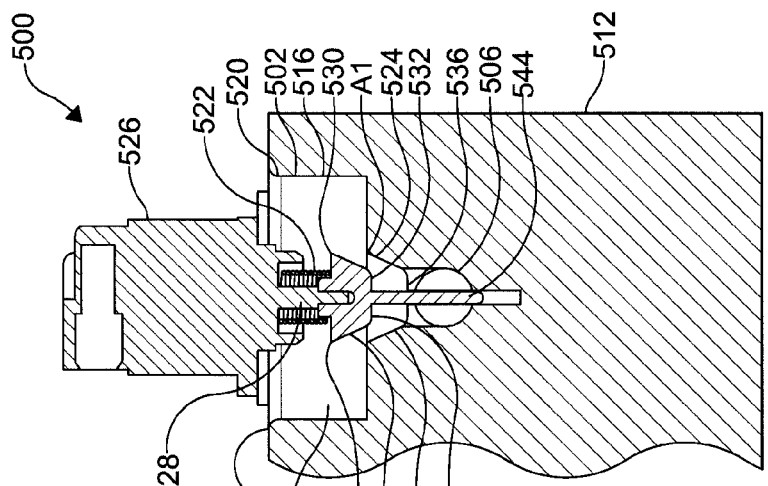
FIG. 21 depicts a sectional view of the valve assembly of FIG. 20 when the tire pressure is being decreased.
Figure 22:
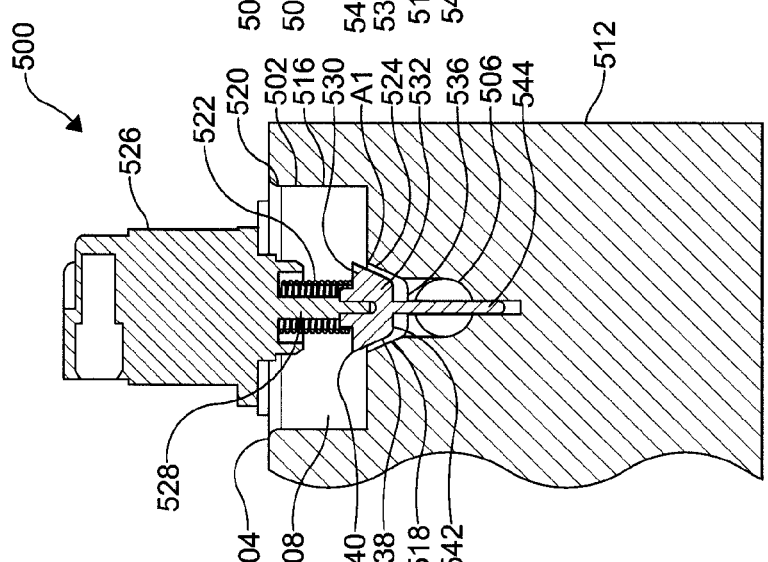
FIG. 22 depicts a sectional view of the valve assembly of FIG. 20 when the tire pressure is being decreased.
Figure 23:
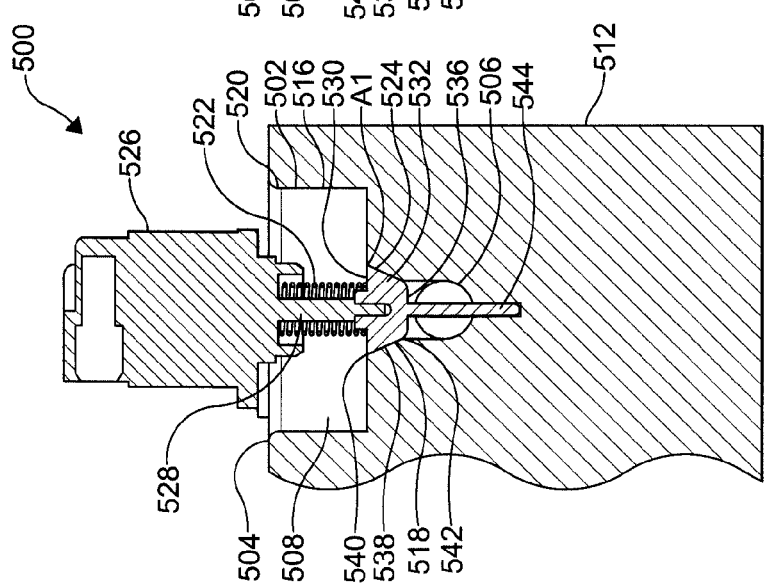
FIG. 23 depicts a sectional view of the valve assembly of FIG. 20 when the tire pressure is being decreased.

With reference to FIGS. 21-23, the area A1 is of a size which varies depending on the tire pressure as described above. When the tire pressure is being decreased, a signal which depends on the tire pressure is received by the motor assembly 526. The signal causes the motor assembly 526 to extend or retract the valve member 530 via the shaft portion 528. The motor assembly 526 incrementally extends and retracts the valve member 530 to increase or decrease the size of the area A1. Preferably, the length of the increment that the valve member 530 extends or retracts is predetermined.

As the tire pressure is decreased, the valve member 530 is generally retracted toward the cavity 508 to increase the size of area A1 so that the flow capacity through the area A1 is substantially maintained and the pressure to maintain the wheel valve in the open position is provided. Thus, in these embodiments, the valve assembly 500 controls the flow capacity through the area A1 and the pressure in the central tire inflation system to maintain the wheel valve assembly in the open position as the tire pressure is decreased.

A guide rod 544 is attached to the end 536 of the valve member 530. The guide rod 544 extends through the second port 506 and into the pneumatic control unit 512. The guide rod 544 is aligned with the centerline 546 of the valve member 530 and the shaft portion 528. The guide rod 544 allows the valve member 530 to maintain its position relative to the wall portion 524 so that the area A1 is uniform.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim is:

1. A valve assembly for a central tire inflation system, comprising:
    a first housing having a first port connected to a second port via a cavity, wherein the second port is in fluid communication with a wheel assembly;
    a biasing member disposed in the cavity adjacent a first perforation formed in the first housing; and
    a valve member contacted by the biasing member, the valve member comprising a top frusto-conical portion having a continuous outer surface connected to a bottom rounded portion having a continuous outer surface, a first end connected to the bottom rounded portion and a second end connected to the top frusto-conical portion wherein the second end has an opening therein providing for a single channel extending through the valve member from the second end to the first end to allow a pressurized fluid to flow between the housing and the outer surface of the valve member and through the channel.

2. The valve assembly of claim 1, wherein the top frusto-conical portion reduced in diameter toward the second end.

3. The valve assembly of claim 1, wherein the biasing member biases the valve member away from the first perforation and toward the second port.

4. The valve assembly of claim 1, wherein the first perforation is sized to receive the top frusto-conical portion.

5. The valve assembly of claim 1, wherein the top frusto-conical portion comprises a first diameter portion and a second diameter portion, the first diameter portion being of a diameter which is greater than that of the second diameter portion and gradually reducing in diameter toward the second diameter portion which gradually reduces in diameter toward the second end.

6. The valve assembly of claim 1, wherein the first port is in fluid communication with the second port via a flow pathway formed between the housing and the outer surfaces of the valve member and through the channel.

7. The valve assembly of claim 1, wherein a pressurized air biases the valve member and opposes a bias provided by the biasing member to the valve member.

8. The valve assembly of claim 1, further comprising an area formed in the first perforation which varies in size depending on tire pressure.

9. The valve assembly of claim 8, wherein the area is defined by an inner wall portion of the housing and the top frusto-conical portion of the valve member.

10. The valve assembly of claim 8, wherein the area increases in size as the tire pressure decreases.

11. The valve assembly of claim 9, wherein the area is defined by the outer surface of the top frusto-conical portion.

12. The valve assembly of claim 1, wherein the first housing is positioned within a second housing which comprises a control port and a tire port.

13. The valve assembly of claim 12, further comprising a valve device in fluid communication with the control port and the first perforation, the valve device positioned within the second housing operable between an open position and a closed position which allows or prevents fluid communication between the control port and tire port, respectively.

14. The valve assembly of claim 13, further comprising a major biasing member which biases the valve device to the closed position.

15. The valve assembly of claim 14, wherein the major biasing member and biasing member each comprise a spring.

16. The valve assembly of claim 1, further comprising a valve device in fluid communication with the valve assembly which selectively prevents fluid communication between the valve assembly and a source of pressurized air.

17. The valve assembly of claim 16, wherein the source of pressurized air is an air compressor or a wheel assembly.

18. The valve assembly of claim 16, wherein pressurized air is communicated to the valve assembly via the valve device and a fluid conduit.

19. A wheel valve assembly as defined by claim 1.

* * * * *